United States Patent
Röhm

(10) Patent No.: US 6,517,088 B1
(45) Date of Patent: Feb. 11, 2003

(54) LOCKABLE DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 105 days.

(21) Appl. No.: 09/634,015

(22) Filed: Aug. 8, 2000

(51) Int. Cl.⁷ ............................................. B23B 31/12
(52) U.S. Cl. ........................ 279/62; 279/140; 279/157; 279/902
(58) Field of Search .............................. 279/60–65, 140, 279/902, 157

(56) References Cited

U.S. PATENT DOCUMENTS

| | | | | |
|---|---|---|---|---|
| 3,810,642 A | * | 5/1974 | Derbyshire | 279/62 |
| 3,992,020 A | * | 11/1976 | Derbyshire | 279/60 |
| 5,765,839 A | * | 6/1998 | Rohm | 279/62 |
| 5,829,761 A | * | 11/1998 | Rohm | 279/62 |
| 5,957,469 A | * | 9/1999 | Miles et al. | 279/62 |
| 5,988,958 A | * | 11/1999 | Mack | 279/62 |
| 6,341,783 B1 | * | 1/2002 | Rohm | 279/62 |

* cited by examiner

Primary Examiner—Steven C. Bishop
(74) Attorney, Agent, or Firm—Herbert Dubno; Andrew Wilford

(57) ABSTRACT

A lockable drill chuck has a body centered on and rotatable about an axis and formed with a plurality of angled guides opening axially forward at a front chuck end, respective jaws axially and radially displaceable in the guides and each formed with a row of teeth, and a tightening ring axially fixed but rotatable about the axis on the body and having a screwthread meshing with the teeth so that rotation of the inner ring on the body in a tightening direction displaces the jaws in their guides toward one other and rotation in a loosening direction displaces the jaws away from one other. A one-piece outer sleeve rotatable about the axis on the body is formed unitarily with a pressed-in radially inwardly projecting cam formation. A locking member is displaceable by the cam formation between a locked position braced between the chuck body and the tightening ring for blocking rotation about the axis of the tightening ring on the body in the loosening direction and an unlocked position for permitting such rotation. The outer sleeve is metallic, of substantially uniform wall thickness, and formed with an outwardly open pocket at the cam formation.

28 Claims, 19 Drawing Sheets

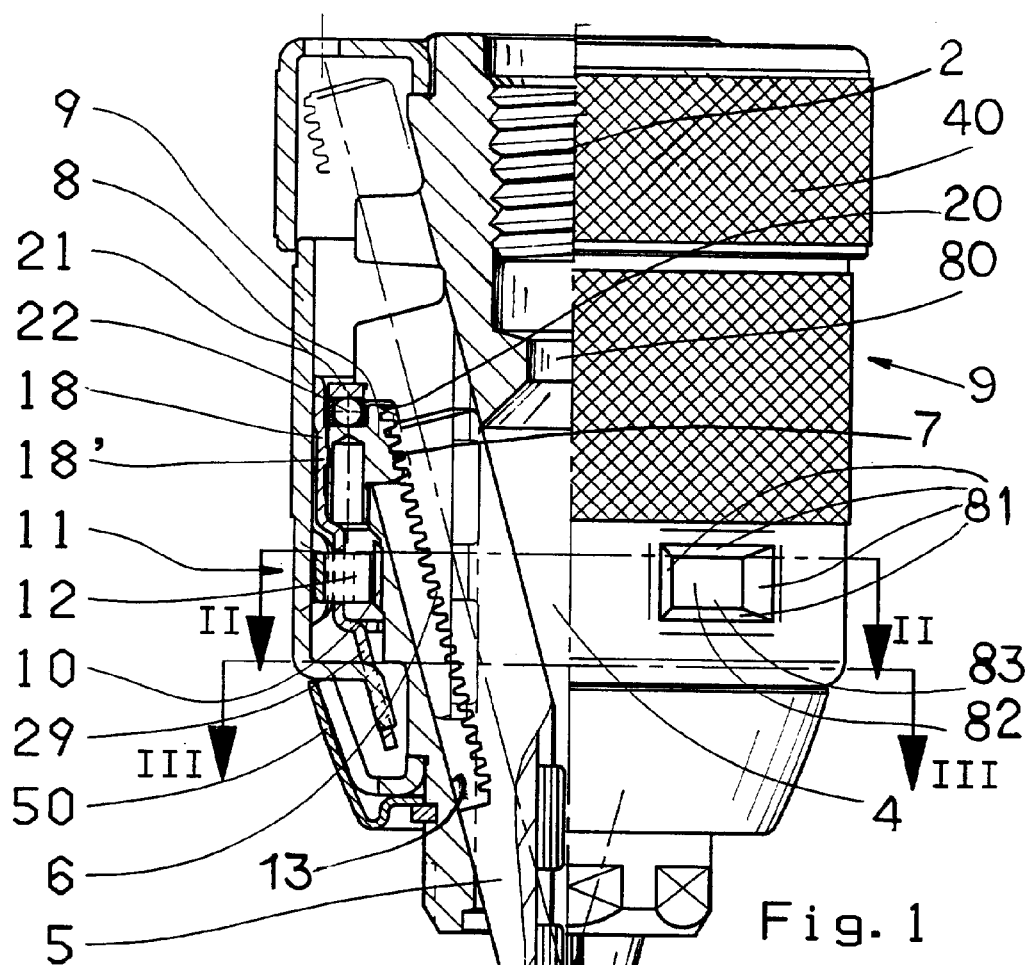
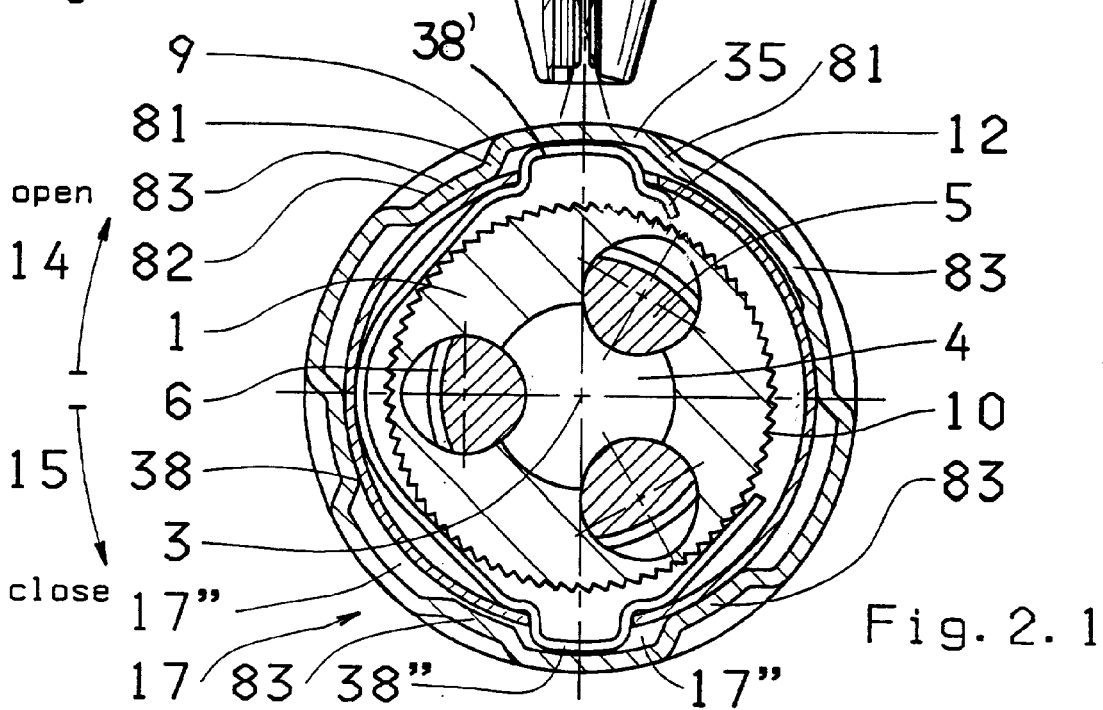

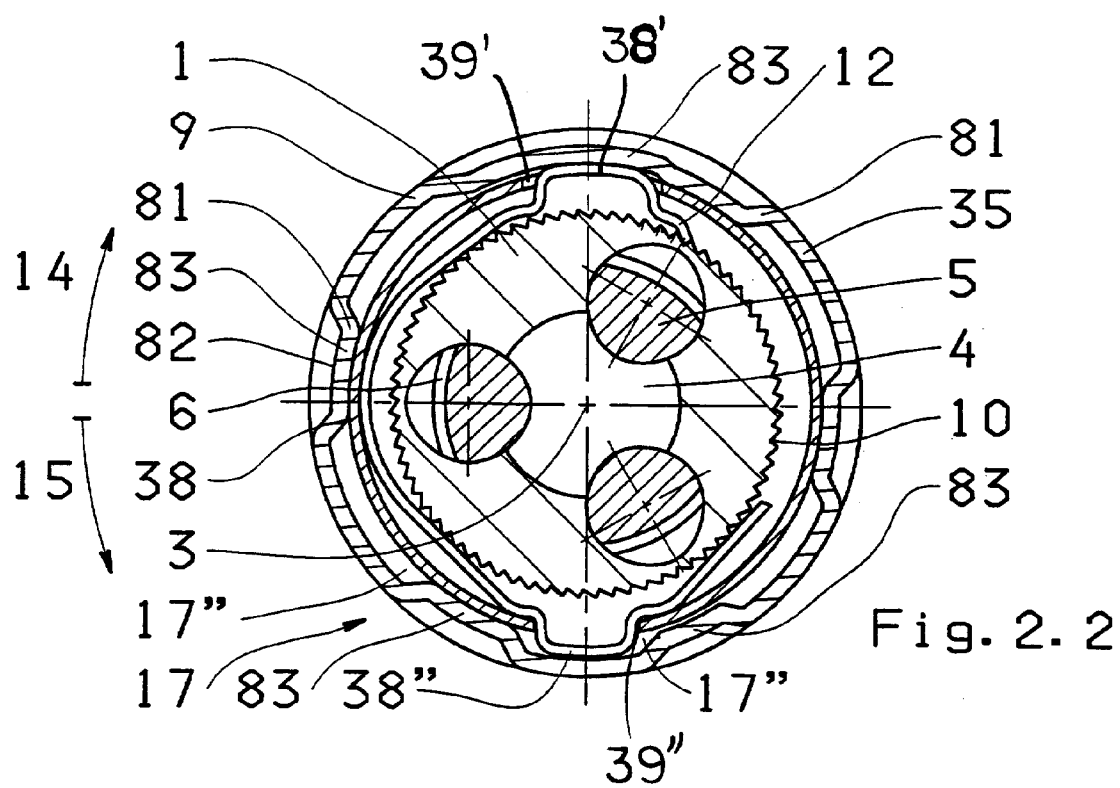
Fig. 2.2
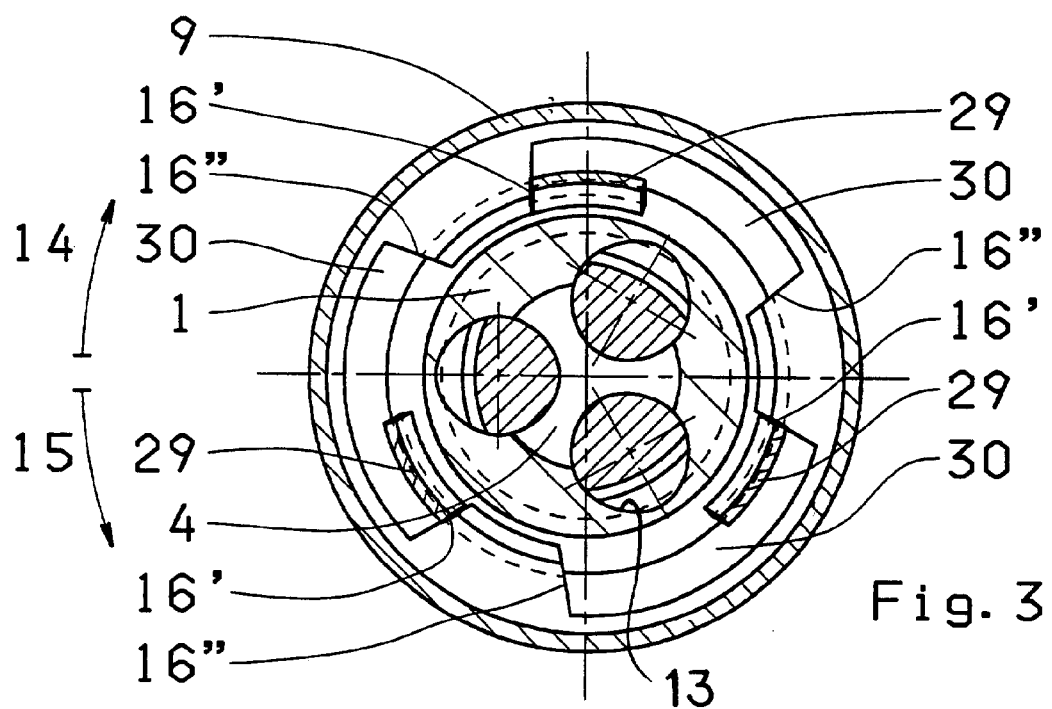
Fig. 3

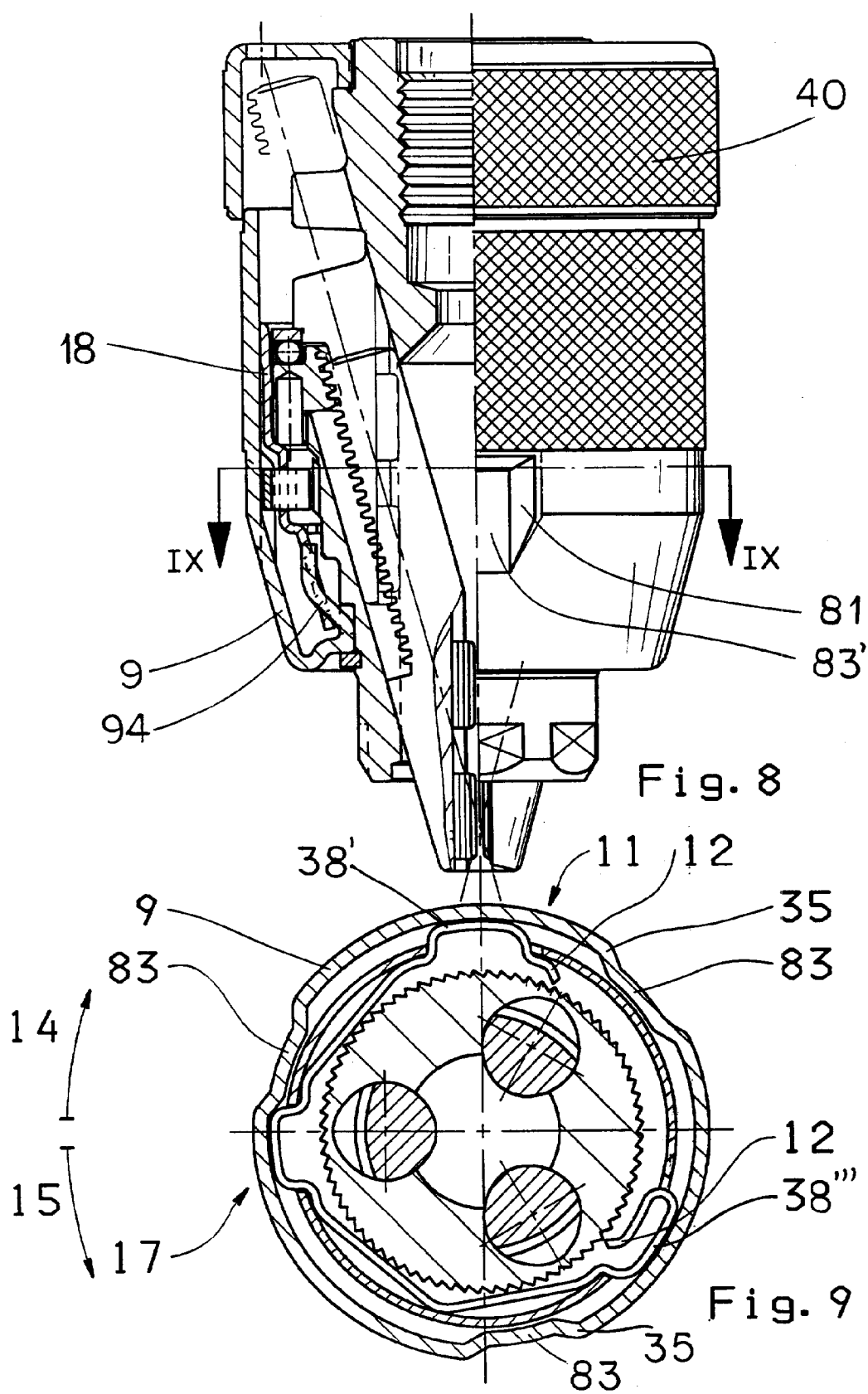

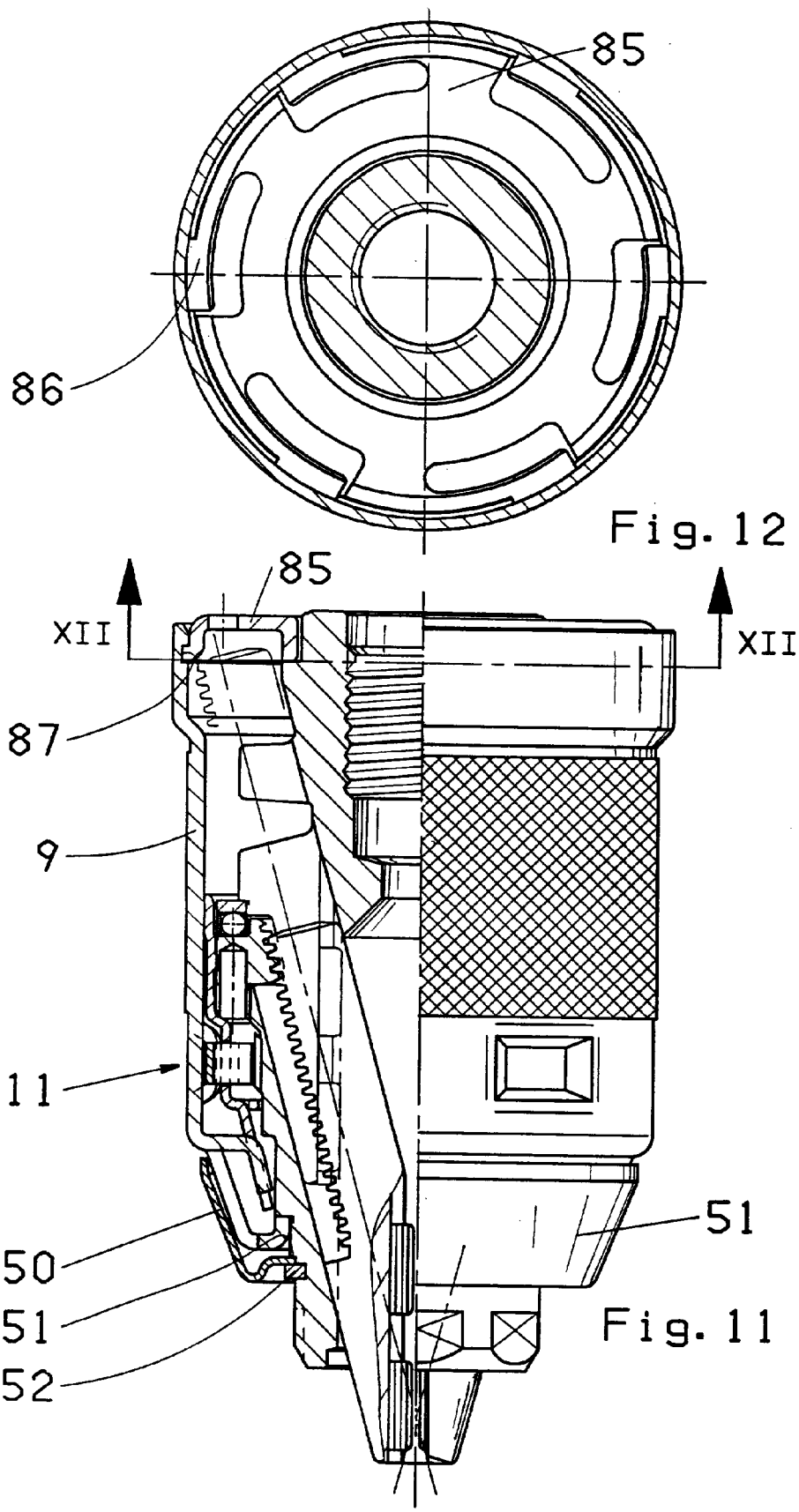

LOCKABLE DRILL CHUCK

FIELD OF THE INVENTION

The present invention relates to a drill chuck. More particularly this invention concerns such a chuck which can be locked so that it does not loosen during use.

BACKGROUND OF THE INVENTION

A standard drill chuck has a body centered on and rotatable about an axis and formed with a plurality of angled guides opening axially forward at a front chuck end and respective jaws axially and radially displaceable in the guides and each formed with a row of teeth. A metallic tightening ring axially fixed but rotatable about the axis on the body has a screwthread meshing with the teeth so that rotation of the tightening ring displaces the jaws in their guides. An adjustment sleeve is rotatable about the axis on the body on a metallic intermediate ring fixed on the tightening ring and is coupled to the tightening ring to rotate it and set the position of the jaws of the chuck.

In the system described in U.S. Pat. No. 5,829,761 the adjustment sleeve rotatable about the axis on the body has a hard outer part and an inner part of a softer material fixed on the outer part. The metallic intermediate ring fixed on the tightening ring has formations coupled to the hard outer part and the inner part rides on the intermediate ring.

The hard, normally steel, outer sleeve part is resistant to damage during normal use so that if a wrench must be applied to it, for instance, it will not be ruined. Since the intermediate ring is coupled directly to this hard outer ring, no torque is transmitted by plastic parts and, therefore, the adjustment ring can be actuated forcibly without damage to it. On the other hand the inner part is made of plastic which can easily be formed, for instance by molding, to have a very complex shape and which can be counted on to ride smoothly on the metal intermediate ring. Such a chuck is much cheaper to manufacture than one with a one-piece tightening ring where normally the complex internal surface must be formed by an expensive and slow machining operation.

OBJECTS OF THE INVENTION

It is therefore an object of the present invention to provide an improved lockable drill chuck.

Another object is the provision of such an improved lockable drill chuck which overcomes the above-given disadvantages, that is which is inexpensive to manufacture yet whose adjustment sleeve is of one-piece metallic construction.

A further object is to provide an economical method of making the critical outer sleeve of the chuck.

SUMMARY OF THE INVENTION

A lockable drill chuck has according to the invention a body centered on and rotatable about an axis and formed with a plurality of angled guides opening axially forward at a front chuck end, respective jaws axially and radially displaceable in the guides and each formed with a row of teeth, and a tightening ring axially fixed but rotatable about the axis on the body and having a screwthread meshing with the teeth so that rotation of the tightening ring on the body in a tightening direction displaces the jaws in their guides toward one other and rotation in a loosening direction displaces the jaws away from one other. A one-piece outer sleeve rotatable about the axis on the body is formed unitarily with a pressed-in radially inwardly projecting cam formation. A locking member is displaceable by the cam formation between a locked position braced between the chuck body and the tightening ring for blocking rotation about the axis of the tightening ring on the body in the loosening direction and an unlocked position for permitting such rotation. The outer sleeve is metallic, of substantially uniform wall thickness, and formed with an outwardly open pocket at the cam formation.

Thus the instant invention uses a sleeve which can be produced at low cost with no material-removing machining. The sleeve is made by a simple pressing operation. To this end in accordance with the invention a die is pressed against an outer surface of the sleeve over the recess to form an inwardly projecting cam formation on the sleeve. More particularly a mandrel is fitted inside before pressing the die against the sleeve. This mandrel is radially expanded into tight engagement with an inner surface of the sleeve before pressing the die against the sleeve, and radially contracted out of contact with the inner sleeve surface after pressing the die against the sleeve. In a similar manner, a clip-receiving groove is formed in the sleeve by pressing a tool into radial engagement with the sleeve all around the sleeve. All of these operations are carried out purely by deforming the axially symmetrical workpiece, that is without any complex and difficult machining operations. Thus the sleeve is produced at very low cost.

According to the invention the outer sleeve is formed with a plurality of such cam formations and respective pockets spaced angularly about the axis. In addition a shield cap can be fixed to the chuck body at the front end thereof to cover a front end of the outer sleeve.

The locking system includes an array or radially outwardly directed teeth formed on the chuck body. The locking member includes a tooth part engageable with the teeth, a spring part urging the tooth part out of engagement with the teeth, and a cam part engageable with the cam formation and displaceable radially thereby jointly with the tooth part. The teeth are sawteeth having steep flanks directed in the loosening direction.

The drill chuck further has according to the invention an inner sleeve fixed rotationally to the locking ring coaxially within the outer sleeve and having an end juxtaposed with an end of the outer sleeve and formations on the sleeve ends for forming a lost-motion rotational coupling between the sleeves so that the outer sleeve can move limitedly angularly relative to the inner sleeve between one end position with the cam formation engaging the cam part and pressing the tooth against the teeth and an opposite end position with the cam formation out of engagement with the cam part. A spring releasably retains the outer sleeve in its end positions. This spring prevents the chuck from moving into the unlocked position during drilling, and holds the parts in the unlocked position during loosening.

The formations on the sleeve ends include at least one axially directed finger of predetermined angular dimension formed on one of the sleeves and a cutout formed in the other of the sleeves, receiving the finger, and of a substantially greater angular dimension than the finger. The outer sleeve is formed at the front end with a plurality of such fingers angularly spaced about the axis. The inner sleeve is formed with a plurality of such cutouts receiving the fingers. The outer sleeve is unitarily formed with the fingers which can extend axially back from a front end of the outer sleeve. In this case the fingers extend at an acute angle to the axis.

The locking member according to the invention can have two such tooth parts and two such respective cam parts. The outer sleeve has two such cam formations engageable with the locking-member cam parts. Alternately the locking member can have opposite ends forming the tooth parts and be formed therebetween with the spring part and cam parts. In another system the chuck has two such locking members angularly offset from each other and the sleeve has two such cam formations engageable with the respective cam parts.

The locking member is normally formed according to the invention of a single elastically deformable metallic strip, typically of spring steel. It can be formed with undulations so that it has a damping effect.

A snap ring is set in the front end of the chuck and bears axially backward on the sleeve. In addition the outer sleeve is formed with a plurality of angularly spaced slots and an annular spring clip is engaged around the outer sleeve and has parts projecting through the slots and bearing axially forward on the chuck body. In another system a washer is engaged between a rear end of the chuck body and a rear end of the outer sleeve. This washer can be fixed to the chuck body and axially coupled to the outer sleeve. In this case the outer sleeve has at its rear end an inwardly open groove receiving an outer edge of the washer. Such a washer has a plurality of radially elastically deflectable arms having radially outer ends forming the washer outer edge and received in the groove of the sleeve.

BRIEF DESCRIPTION OF THE DRAWING

The above and other objects, features, and advantages will become more readily apparent from the following description, reference being made to the accompanying drawing in which:

FIG. 1 is a side view partly in axial section through a chuck according to the invention in the unlocked condition;

FIGS. 2.1 and 2.2 are sections taken along line II—II of FIG. 1 showing the chuck in the unlocked and locked conditions, respectively;

FIG. 3 is a section taken along line III—III of FIG. 1;

FIG. 8 is a view like FIG. 1 of another variant on the chuck;

FIG. 9 is a section taken along line IX—IX of FIG. 8;

FIGS. 10 and 11 are views like FIG. 1 of other variants on the chuck;

FIG. 12 is a section taken along line XII—XII of FIG. 11;

SPECIFIC DESCRIPTION

Figure 4:
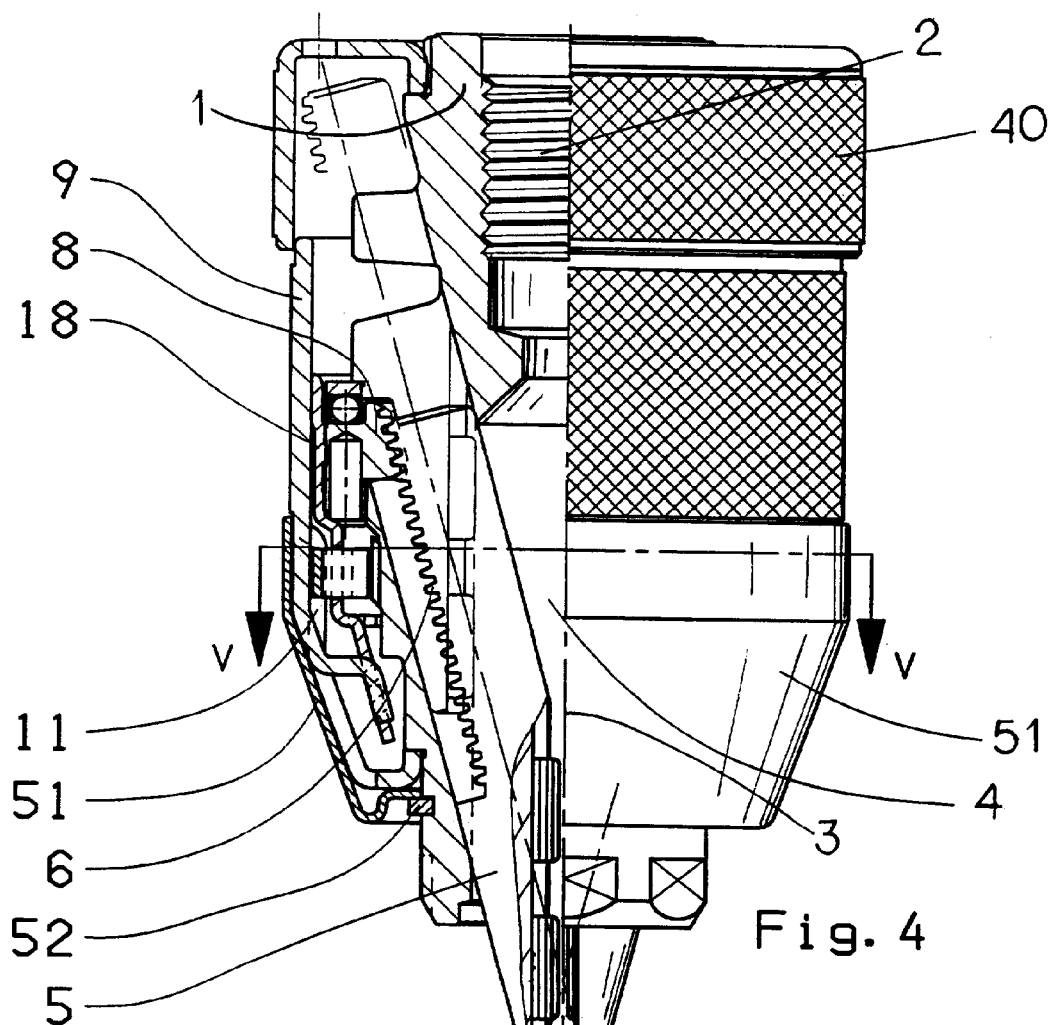
FIG. 4 is a view like FIG. 1 of a variant on the chuck.

As seen in FIGS. 1 through 3 a chuck has a body 1 formed with a rearwardly open threaded hole 2 adapted to be mounted on the spindle of a drill unit for rotation of the chuck about an axis 3. The body 1 is further formed with an axially forwardly open tool-receiving recess 4 communicating with the hole 2 via a passage 80 so that a hammer rod can act directly on a tool in the recess 4. Three angularly equispaced jaws 5 are carried in angled guide passages 13 formed in the body 1 and have outer edges formed with teeth 6 that mesh with a screwthread 7 of an inner tightening ring 8 that is axially fixed but rotatable on the body 1. To this end the ring 8 bears axially rearward via a roller bearing 22 and if necessary via a washer 21 on an axially forwardly directed shoulder 20 the chuck body 1. A knurled holding sleeve 40 is fixed at the rear end of the body 1 for two-handed use of this chuck designed to be tightened and loosened by hand.

According to the invention a one-piece metallic tightening/locking sleeve 9 of substantially uniform wall thickness is axially nondisplaceable on the body 1 and rotatable about the axis 3 on the body 1. A coupling sleeve 18 inside the sleeve 9 is also rotatable about the axis 3 on the body 1. The ring 8 can be formed of two semicircular parts, created for example by drilling and breaking a one-piece annular ring, that can then be mounted on the chuck body 1 and secured together by a sleeve portion 18'.

This sleeve 18 is formed with three axially forwardly projecting coupling fingers 29 that engage in radially inwardly open cutouts or grooves 30 of the sleeve 9 as shown in FIG. 3. The cutouts 30 have flanks 16' and 16" and are angularly much longer than the coupling fingers 29 so as to form a lost-motion coupling and thereby permit substantial relative angular movement of the outer sleeve 9 relative to the inner sleeve 18 in a loosening direction 14 and an opposite tightening direction 15. The sleeve 18 has a cylindrical outside surface that slides smoothly on a cylindrical inside surface of the sleeve 9 during relative rotation as described below. The front ends of the sleeves 9 and 18 are protected and the slots 30 are closed by a sheet-metal cap 50. This cap 50 also prevents direct contact of the sleeve 9 with a stationary object, for instance a wall in which a hole is being drilled, from rotating the sleeve 9 relative to the body 1 and excessively tightening the chuck.

A locking mechanism 11 is provided between the sleeve 18 and the chuck body 1 for permitting free relative rotation of the ring 8 and body 1 the loosening direction 14 but which can be set to prevent opposite relative rotation in the tightening direction 14. To this end the body 1 is formed with an annular array of outwardly directed sawteeth 10 having shallow flanks facing angularly in the tightening direction 15 and steep flanks facing oppositely in the loosening direction 14. The mechanism 11 includes a locking member or tooth 12 that is rotationally coupled to the sleeve 18 and displaceable radially between an outer unlocked position shown in FIG. 2.1 in which it is clear of the teeth 10 and an inner locked position shown in FIG. 2.2 in which it is engaged in the teeth 10. In the inner locked position it is still possible for the sleeve 18 to move relative to the body 1 in the tightening direction 15, with ratcheting of the tooth 12 on the back shallow flanks of the teeth 10.

In addition a latching mechanism 17 is provided for retaining the outer sleeve 9 relative to the inner sleeve 18 in two end positions that the sleeve 9 assumes during tightening and loosening of the chuck. Thus vibration during use will normally not be able to displace the locking mechanism 11 from the locking to the freeing positions or vice versa.

A single spring-steel member 38 extending angularly around most of the body 1 within the sleeve 9 has one end forming the tooth 12 and is unitarily formed with radially outwardly projecting entrainment formations or cam bumps 38' and 38" that project radially outward through respective apertures 39' and 39", with the bump 38' close to the tooth 12. The bump 38" forms part of the latching mechanism 17. The interfit of these bumps 38' and 38" with the apertures 39' and 39" serves to lock the member 38 to the sleeve 18 for joint rotation. The bump 38' coacts with a cam formation 35 on the sleeve 9 and the bump 38" can fit into either of two inwardly open pockets 17' and 17". To this end the sleeve 9 is formed with an annular array of outwardly pockets 83 forming a radially inwardly projecting cam bump 82 flanked axially and angularly by angled surfaces or flanks 81 and also forming the cam pockets 17' and 17" of the latch mechanism. These pockets 83 are formed by a simple pressing operation, not by material-removing machining, so that the sleeve 9 is of relatively inexpensive construction.

The bump 82 is positioned such that when the sleeve 9 is rotated on the chuck body 1 in the opening or loosening direction 14 so that the fingers 29 engage the flanks 16" of the cutouts, the bump 38' falls between the cam bumps 82 and is therefore in a radially outer position in which the tooth 12 is clear of the teeth 10 as shown in FIG. 2.1. In this position the sleeve 9, which is now coupled via the coupling sleeve 18 to the threaded ring 8, can therefore be freely rotated to turn the ring 8 and open the chuck, that is spread the jaws 5.

When, however, the sleeve 9 is rotated in the closing or tightening direction 15 relative to the chuck body 1, the fingers 29 will engage the opposite ends 16' of the cutouts 30 to again couple the sleeve 9 via the sleeve 18 to the ring 8, and one of the inwardly projecting bumps 82 will bear on the actuating bump 38' and push in the tooth 12 so that it will engage the teeth 10 as shown in FIGS. 2.2 and 3. Due to the sawtooth shape of the teeth 10, this will not prevent rotation of the sleeve 9 on the body 1 in the tightening direction 15, but such rotation will proceed with ratcheting of the tooth 12 up the shallow back flanks of the teeth 10. Once the chuck is sufficiently tightened and is put to use, however, rearward rotation of the ring 8 to loosen the jaws 5 will be prevented by the engagement of the tooth 12 in the teeth 10.

The latching mechanism 17 ensures that in both end positions of the sleeve 9 relative to the sleeve 18 the two parts will rotate jointly so long as nothing opposes rotation of the sleeve 18 with sufficient force to deflect in the bump 38" and move it from one of the cam pockets 17' and 17" to the other. The only thing to oppose rotation of the sleeve 18 in the loosening direction would be the jaws 5 reaching their outer positions and in the tightening direction would be the jaws 5 bearing on a tool, for instance the shank of a drill bit.

Assumimg the chuck is tightly gripping a tool, it is unlocked and loosened by rotating the sleeve 9 in the direction 14 which, starting from the position of FIGS. 2.2 and 3, will first only move the sleeve 9 relative to the sleeve 18. Since the jaws 5 are locked on something, they will resist movement and to start with the only movement will be of the sleeve 9 relative to the sleeve 18 after overcoming the spring force of the latch 17. This action will also move the actuating-member bump 38' off the bump 82 and allow the tooth 12 to move radially out and off the teeth 10, and will recouple the outer sleeve 9 to the inner sleeve 18 and therethrough to the ring 8 by engagement of the fingers 29 with the groove flanks 16". Further rotation in the direction 15 of the sleeve 9 will therefore entrain the sleeve 18 and locking ring 8 to spread the jaws 5.

Figure 5:
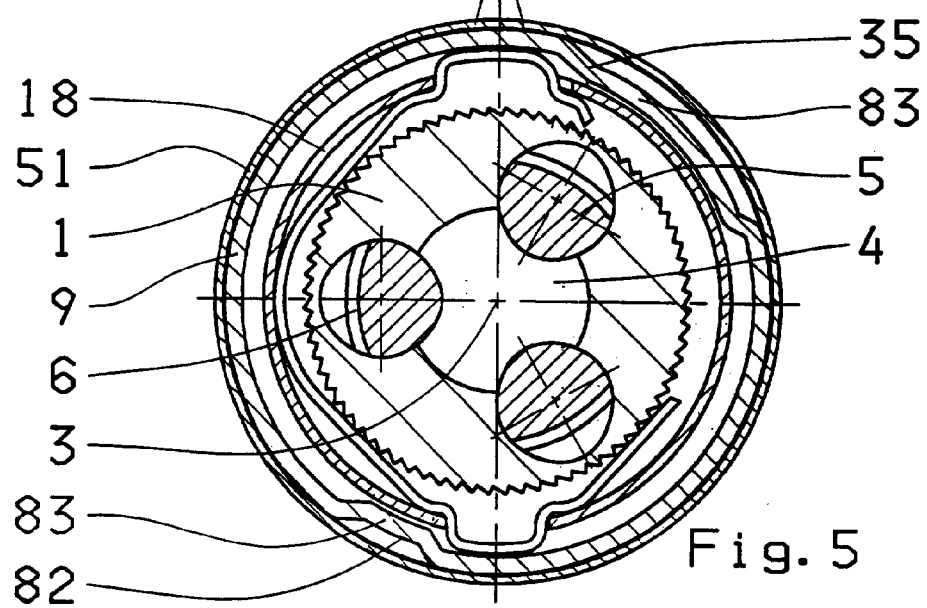
FIG. 5 is a section taken along line V—V of FIG. 4.

The system of FIGS. 4 and 5 is substantially identical to that of FIGS. 1–3, but here there is a long end cap 51 that is secured in place behind a snap ring 52 on the front of the chuck body 1 and that extends back and around the front of the tightening/locking sleeve 9. This cap 51 is symmetrical about the axis 33 and normally rotates with the sleeve 9. It serves to keep chips and particles out of the interior of the chuck.

Figure 6:
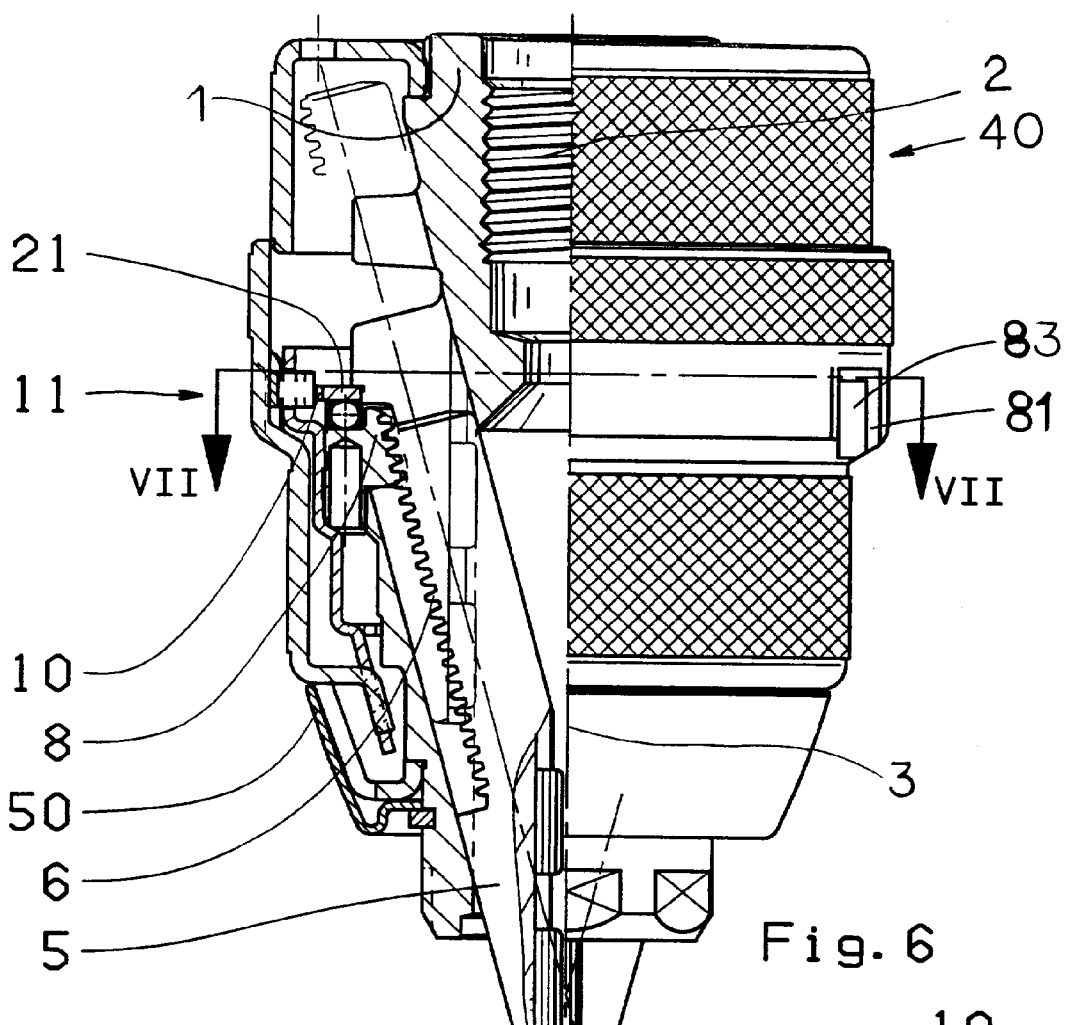
FIG. 6 is a view like FIG. 1 of another variant on the chuck.
Figure 7:
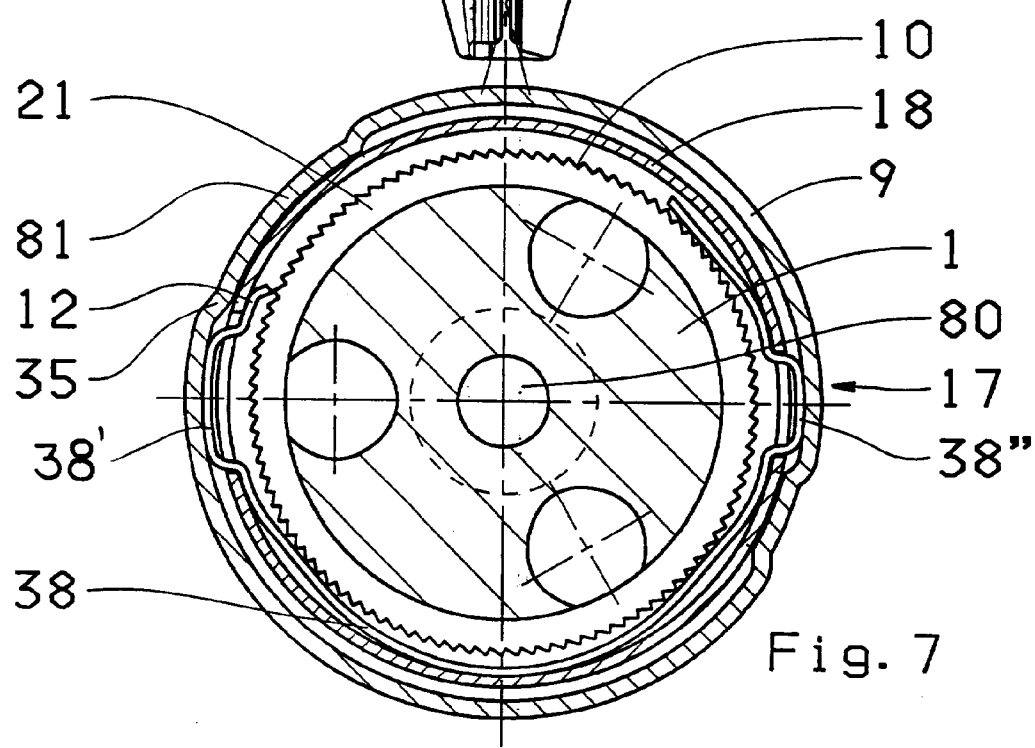
FIG. 7 is a section taken along line VII—VII of FIG. 6.

FIGS. 6 and 7 show a system where the teeth 10 are formed on the ring 21 fixed to the body 1, thereby eliminating the difficult job of cutting these teeth 10 in the body 10. The entire coupling mechanism 11 is thus shifted axially back to be level with this ring 21, but otherwise the structure is substantially identical to that of FIGS. 1–3.

The member 38 in FIGS. 8 and 9 has a rear end forming a loop constituting a third bump 38'" and a second tooth 12'. The cam 35 has a pocket 83 that will cam in the bump 38'" at the same time as the bump 38' is cammed in. Thus the teeth 10 will be engaged at two different locations for very solid locking of the chuck. Here also the front end of the sleeve 9 is folded back in at rearwardly directed coupling fingers 94 that engage the sleeve 18. Thus here there is no need for a protective cap since the sleeve 9 is closed.

Figure 10:
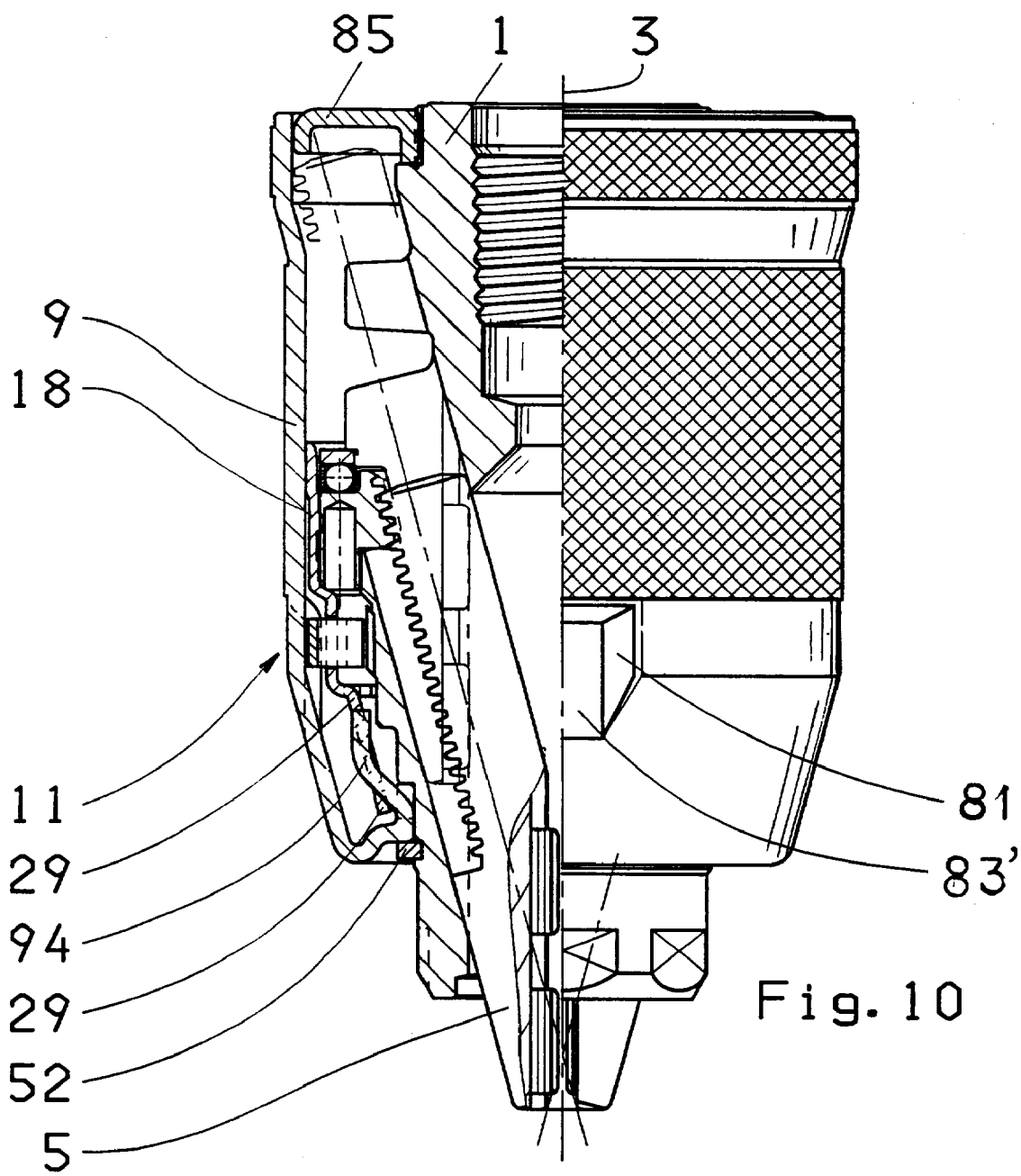

In FIG. 10 the sleeve 9 extends to the rear end of the chuck body 1 where it fits around a washer 85 closing the rear end of the chuck. This washer 85 serves as the mount for the sleeve 9 which is not attached at its front end at all.

FIGS. 11 and 12 show a variant on the FIG. 10 system where the retaining washer 85 is formed with radially deflectable tongues 86 that lock in a radially inwardly open groove 87 formed in the rear end of the sleeve 9 to secure the sleeve 9 to the washer 85 whose inner periphery is a tight force fit on the rear end of the chuck body 1. Thus the sleeve 9 is rotatable on the body 1 but axially retained thereon by the washer 85.

Figure 14:
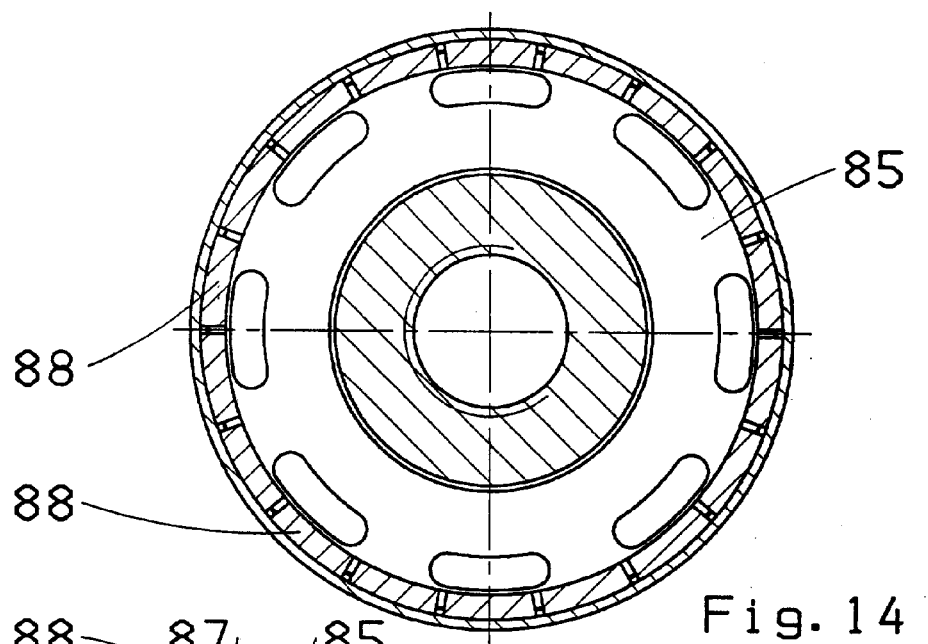
FIG. 14 is a section taken along line XIV—XIV of FIG. 13.
Figure 13:
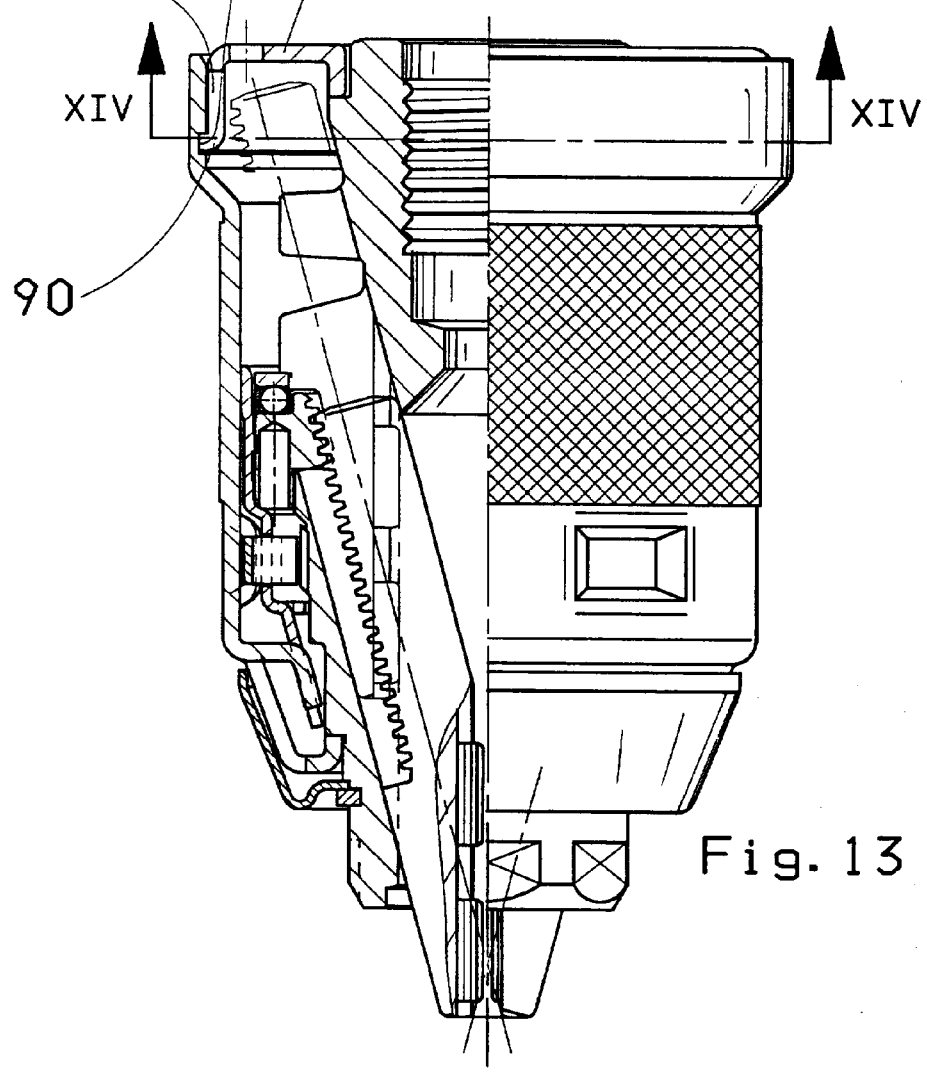
FIG. 13 is a view like FIG. 1 of another variant on the chuck.

In FIGS. 13 and 14 the retaining washer has axially forwardly extending arms 88 with outwardly directed ends 90 that engage in the groove 87 of the sleeve 9. Once again the system can be snapped easily together, but, once assembled, the sleeve 9 will be locked in axial position while still rotating freely on the body 1 through the small angular distance necessary to move between the locked and unlocked positions.

Figure 15:
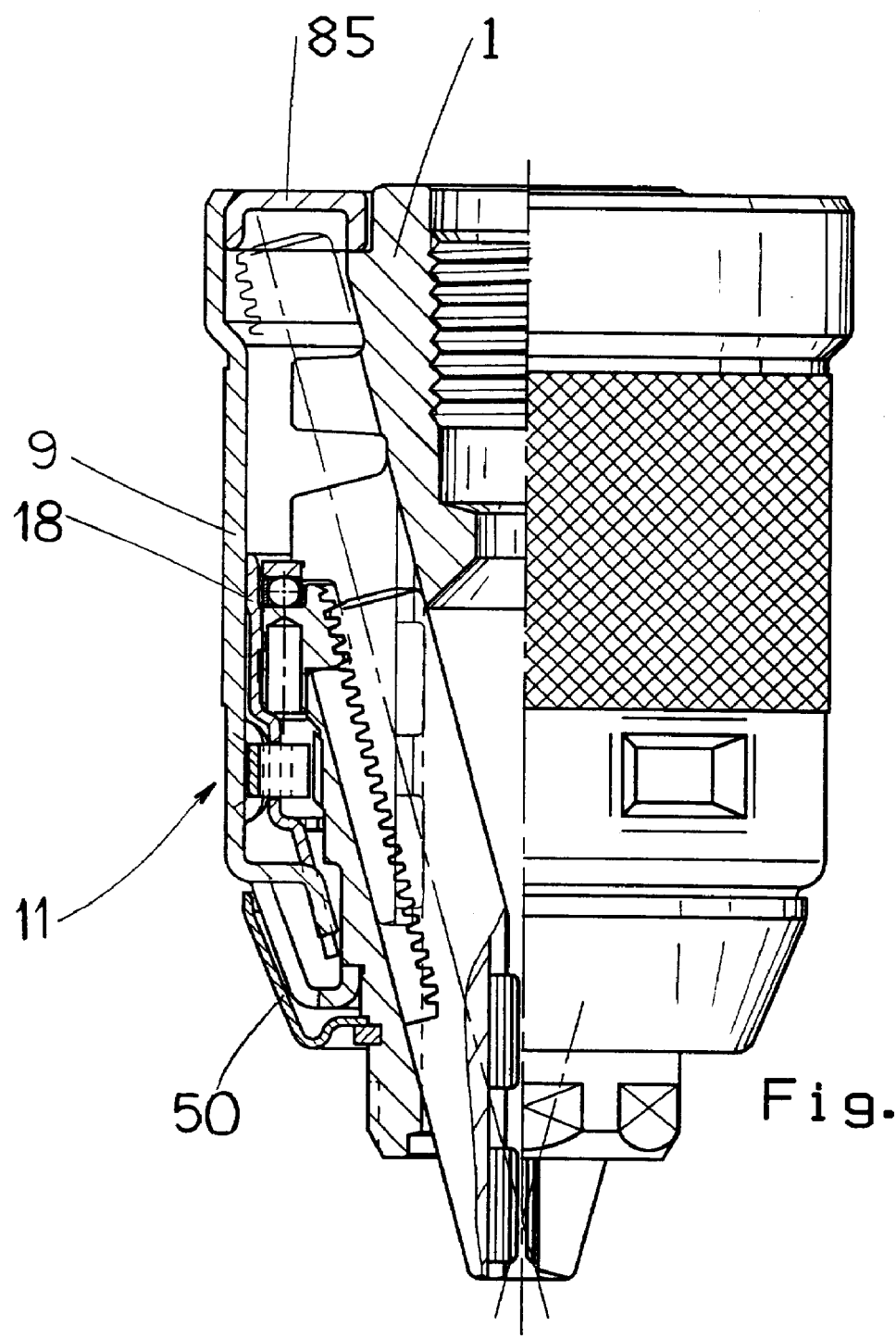
FIGS. 15 and 16 are views like FIG. 1 of other variants on the chuck.

The chuck of FIG. 15 is identical to that of FIG. 1 except that, rather than having a rear holding sleeve 40, the sleeve 9 extends to the rear end and is fitted with the washer 85 which here has an inner periphery that is a loose fit on the chuck body 1 so the sleeve 9 and washer 85 can rotate freely. The sleeve 9 is retained at its front end by the cap 50.

Figure 17:
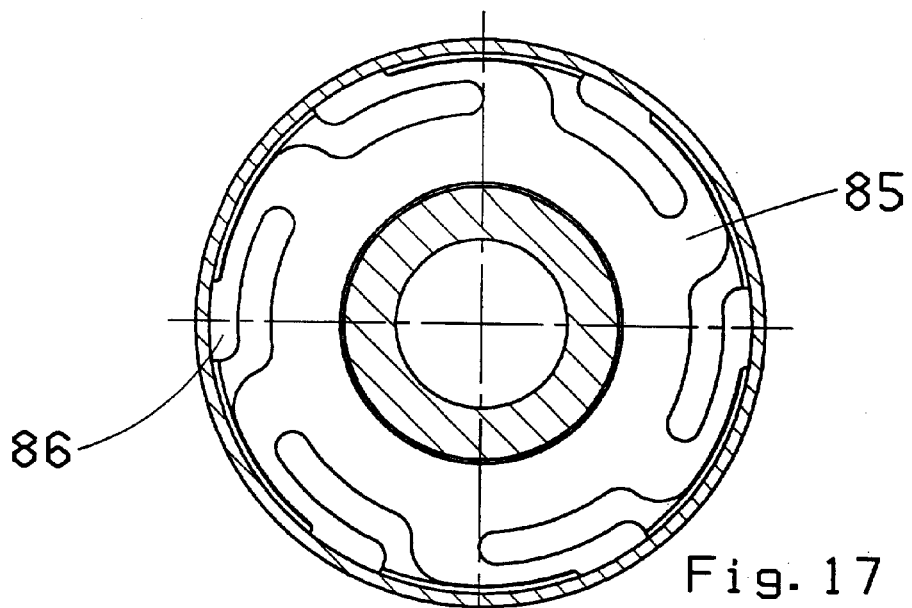
FIG. 17 is a section taken along line XVII—XVII of FIG. 16.
Figure 16:
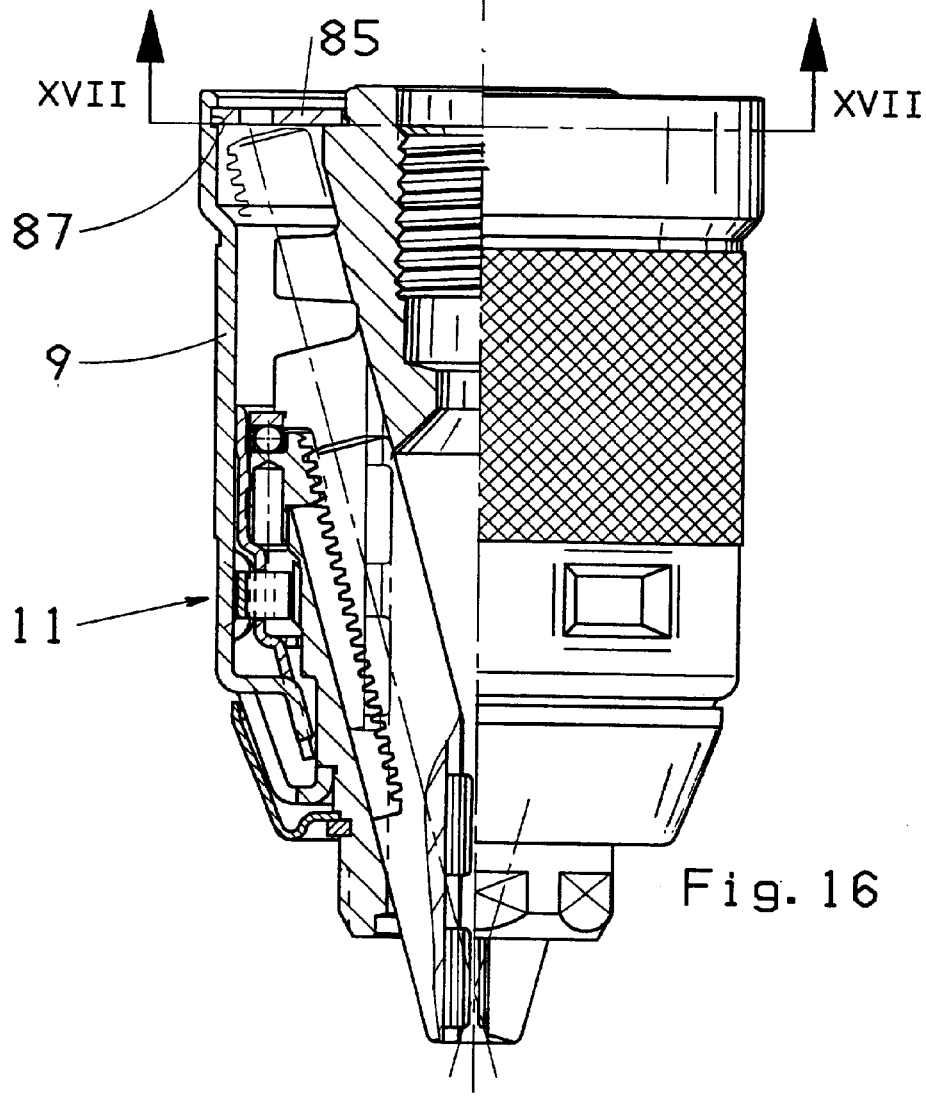

In FIGS. 16 and 17 the sleeve 9 has the inwardly open rear-end groove 87 in which the washer 85 is provided. The washer 85 can have spring arms such as shown at 86 in FIG. 12.

Figure 18:
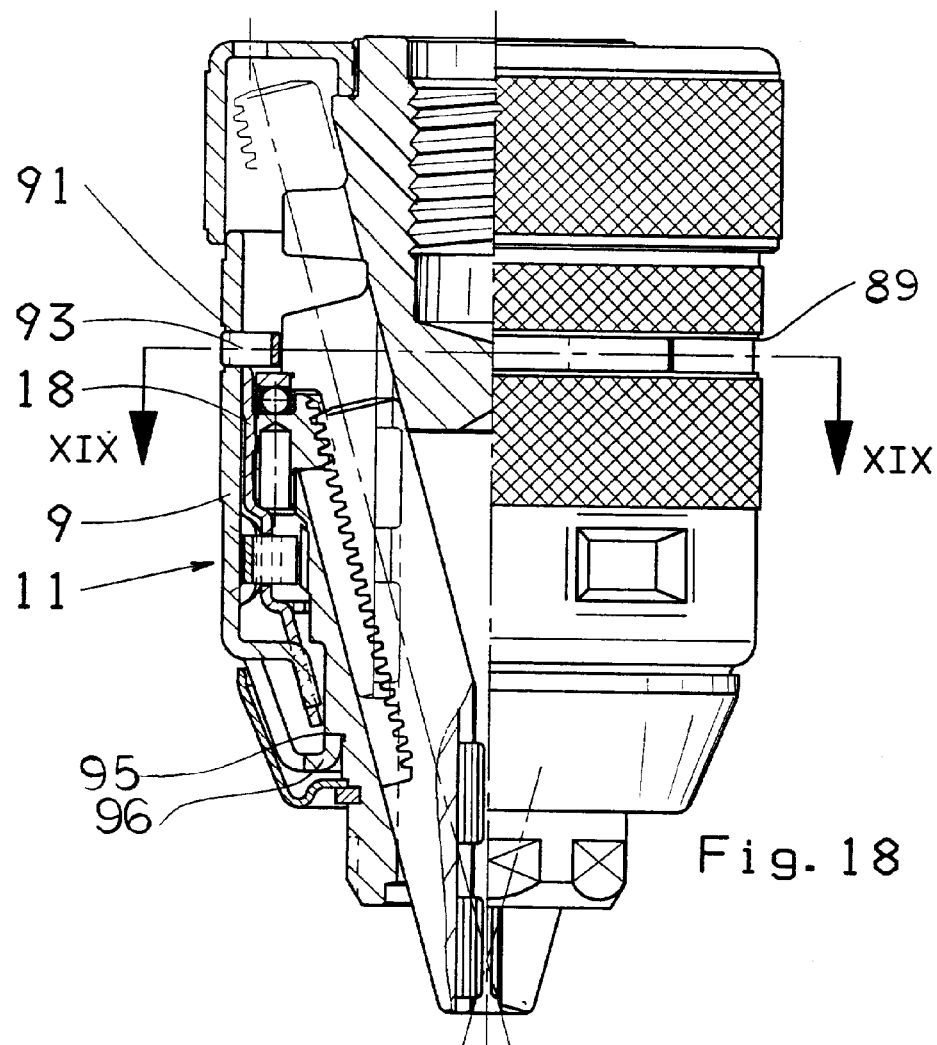
FIG. 18 is a view like FIG. 1 of another variant on the chuck.
Figure 19:
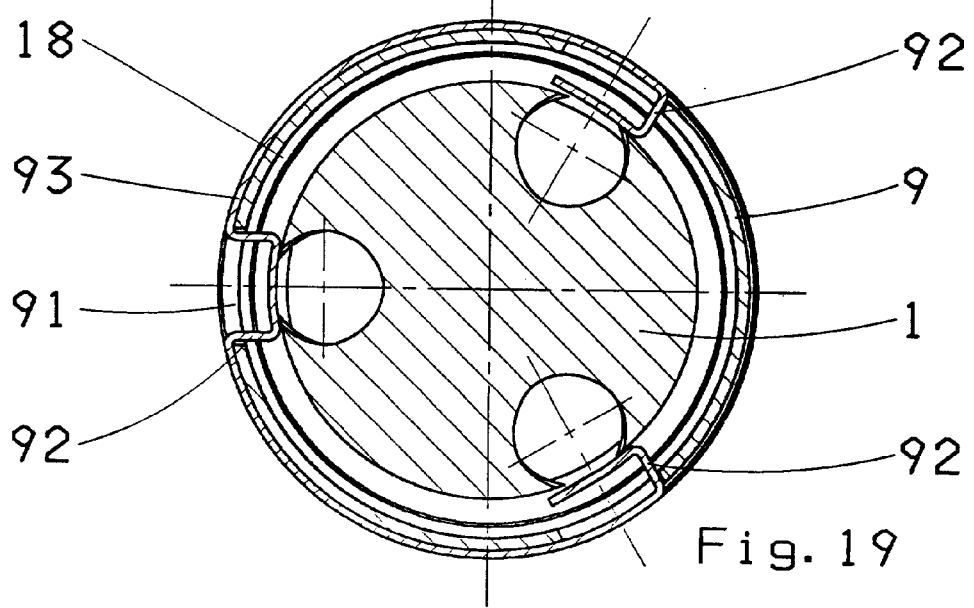
FIG. 19 is a section taken along line XIX—XIX of FIG. 18.

The sleeve 9 is retained in place in FIGS. 18 and 19 by a spring ring 93 set in a groove 89 formed in the sleeve 9 and having bent-in portions 92 that engage through apertures 91 in the sleeve 9 immediately behind the axially fixed retaining ring 21 for the tightening ring 8. The sleeve 9 has a front end 96 that is hooked back and bears axially backward on a forwardly directed shoulder 95 on the chuck body 1. Thus rearward movement of the sleeve 9 is inhibited by the end 96 and shoulder 95 and forward movement by the removable ring 93. This chuck is assembled by slipping the sleeve 9 over the body 1 and jaws 5 from the front end.

Figure 20:
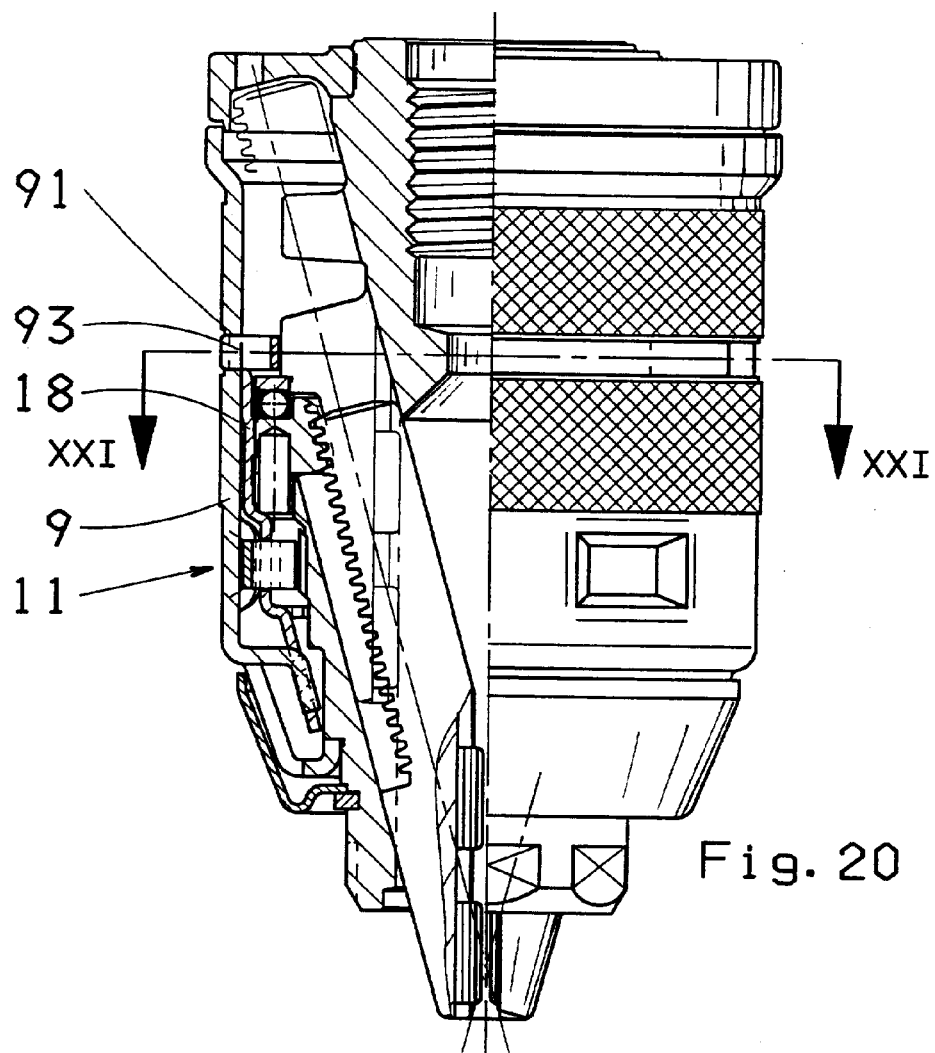
FIG. 20 is a view like FIG. 1 of another variant on the chuck.
Figure 21:
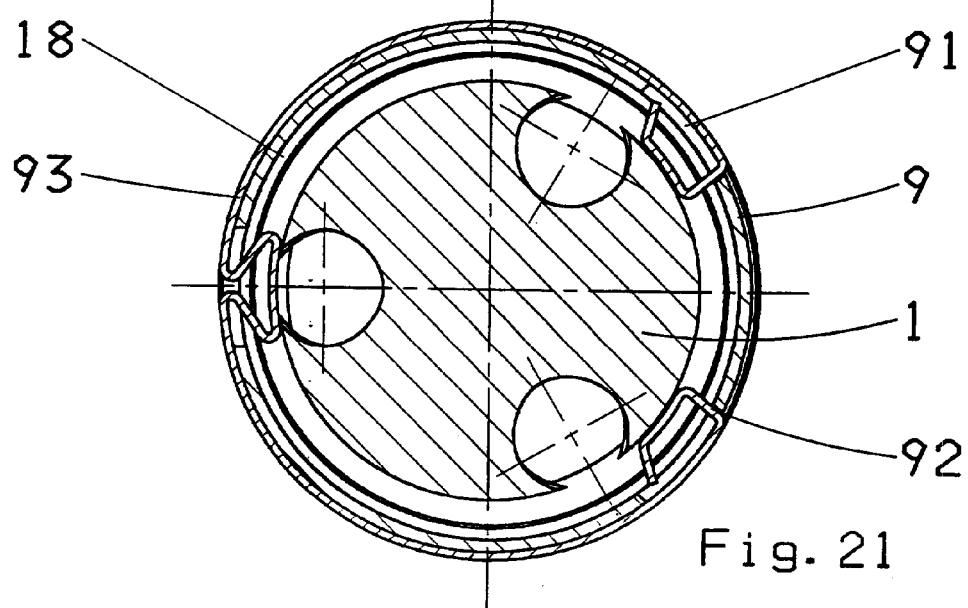
FIG. 21 is a section taken along line XXI—XXI of FIG. 20.

FIGS. 20 and 21 show an arrangement like that of FIGS. 18 and 19, but with a ring 93 whose center bent-in portion is omega-shaped rather than circularly round.

Figure 22:
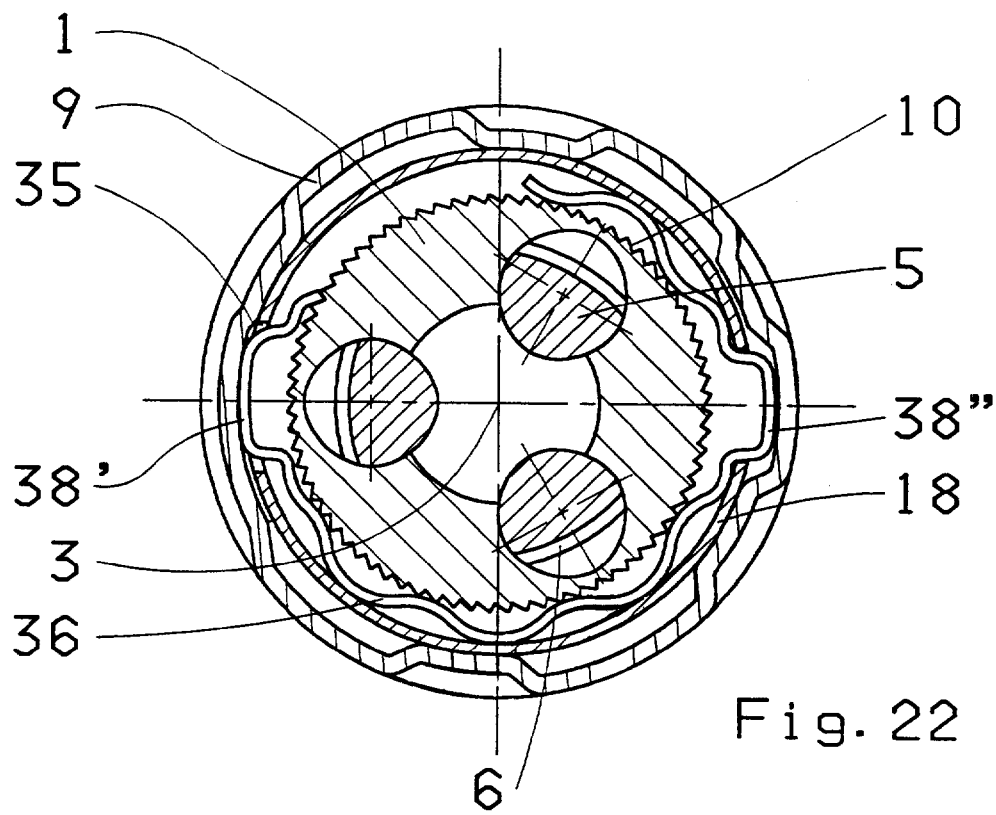
FIG. 22 is a view like FIG. 2.2 with a highly damped locking spring.

FIG. 22 shows a member 38 which is formed with undulations 36 between its portions 38' and 38" and between these portions 38' and 38" and the respective ends of the member 38. These formations 36 create a damping effect in that they allow the member 38 to be much stiffer than would otherwise be possible.

Figure 23:
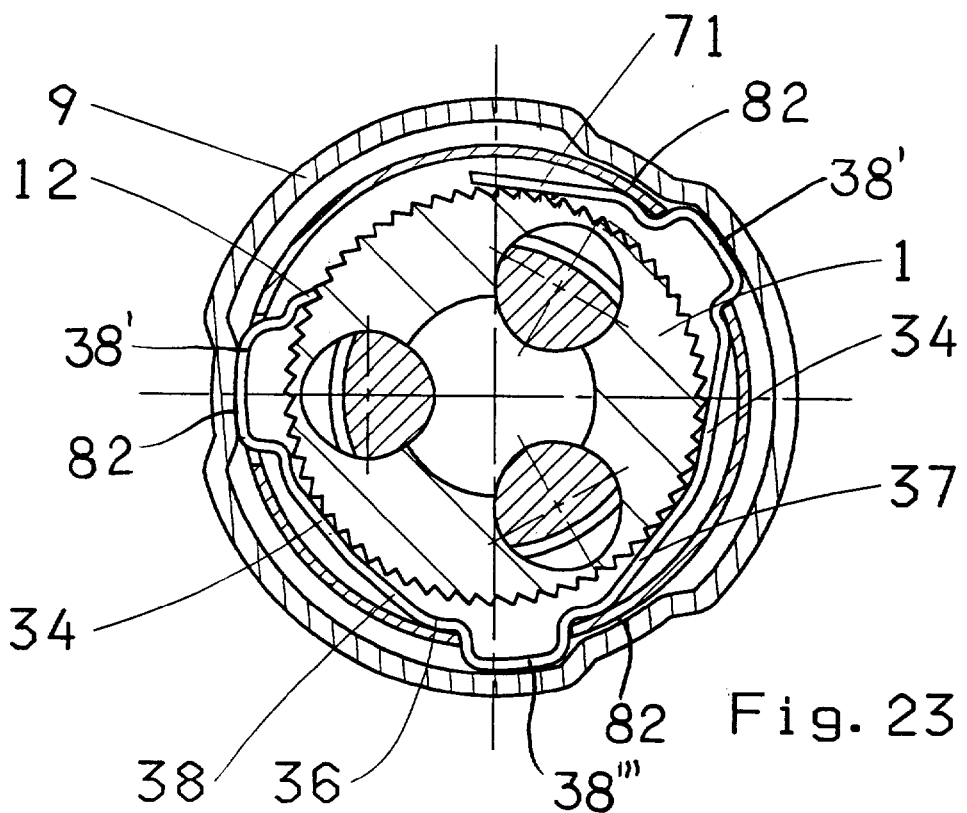
FIG. 23 is a view like FIG. 2.2 with a modified locking spring with two cam bumps.

In FIG. 23 the member 38 has three camming bumps 38', 38", and 38''' so that it is compressed substantially when they all ride up on the respective cam bumps 82.

Figure 24:
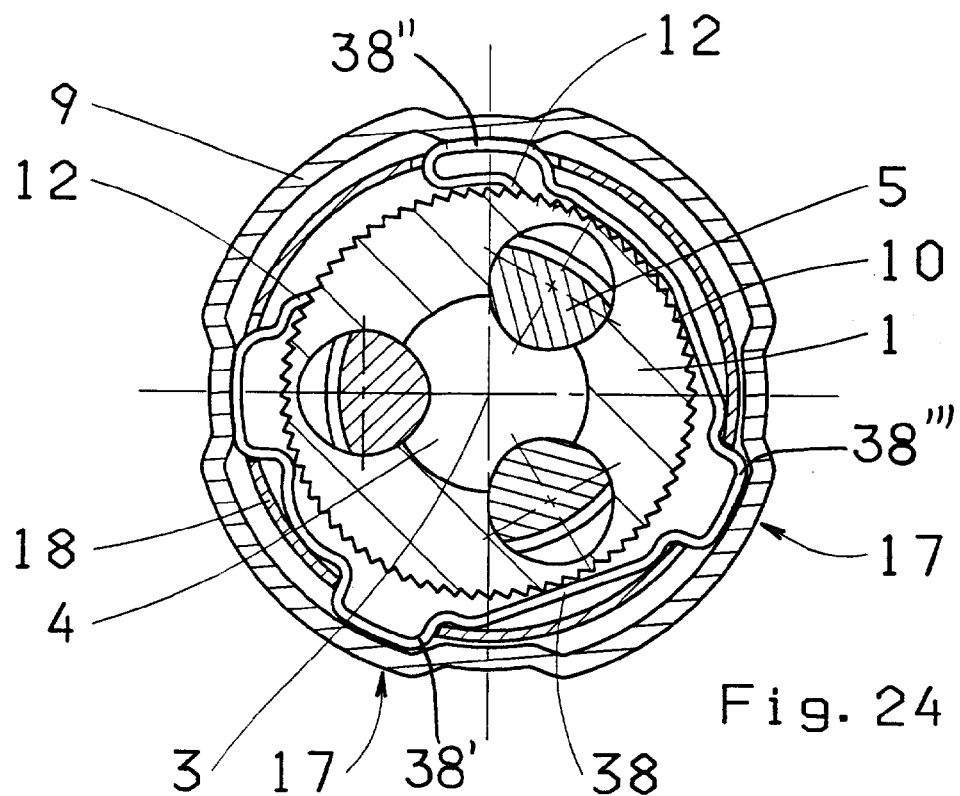
FIG. 24 is a view like FIG. 23 with a spring having two locking members and two cam bumps.

FIG. 24 shows a combination of the structure of FIG. 23 with that of FIG. 9. Thus the member 38 has three bumps 38', 38", and 38''', and the end bump 38" is formed as a loop forming an extra tooth 12'.

Figure 25:
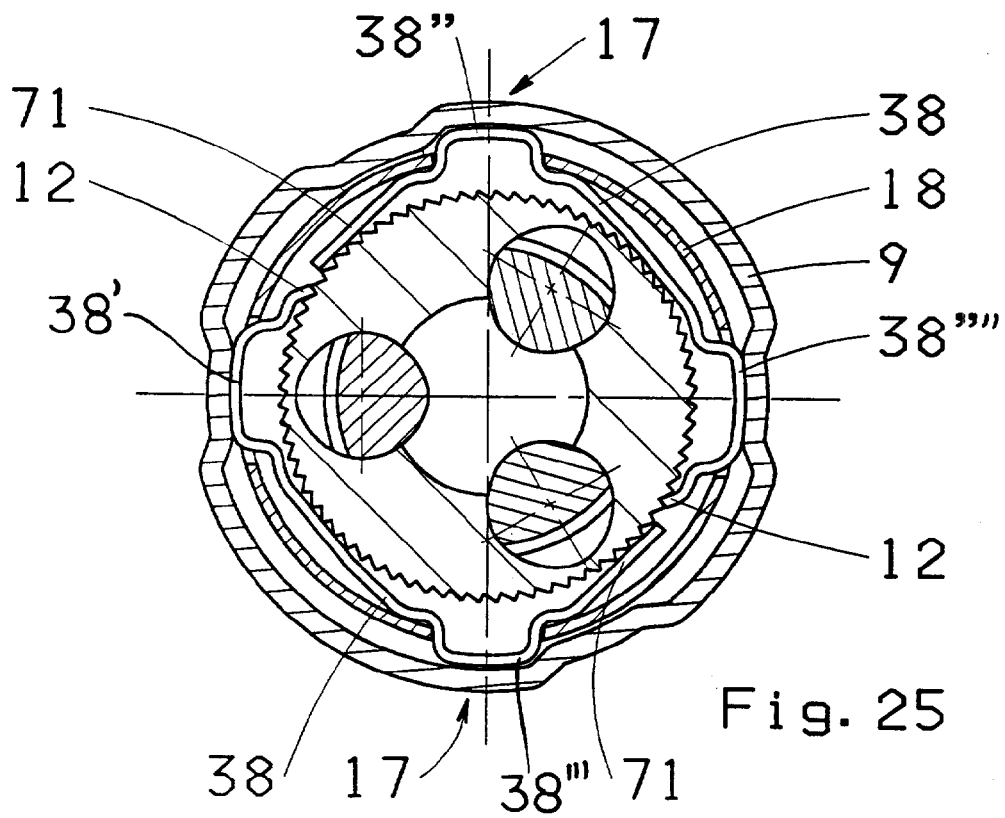
FIG. 25 is a view like FIG. 23 with two locking springs.

In FIG. 25 there are four bumps 38', 38", 38''', and 38"". The member 38 here has a straight rear end 71 that rides on the teeth 10 without engaging between them.

Figure 26:
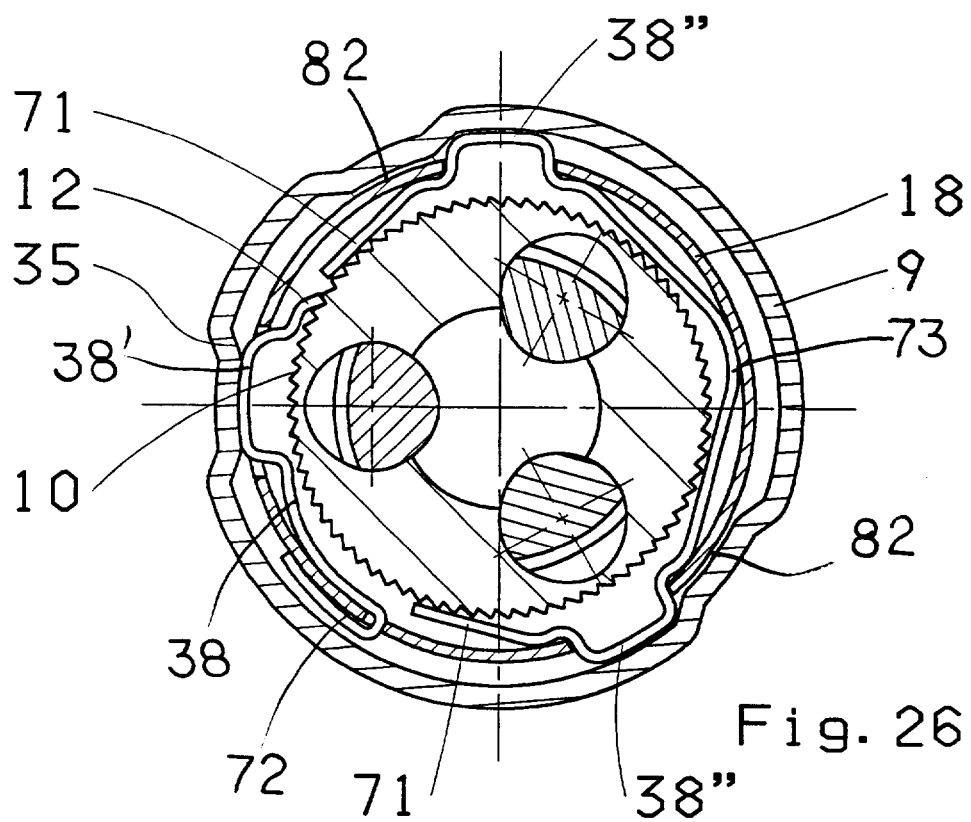
FIG. 26 is a view like FIG. 23 with separate locking and sleeve-retaining springs.

FIG. 26 shows a short member 38 extending around only about one-third of the circumference of the body 1 and having a rear end 72 hooked through the sleeve 18. Another element 73 has two bumps 38" that coact with cam bumps 82 to make movement of the sleeve 9 between its end positions fairly stiff.

Figure 27:
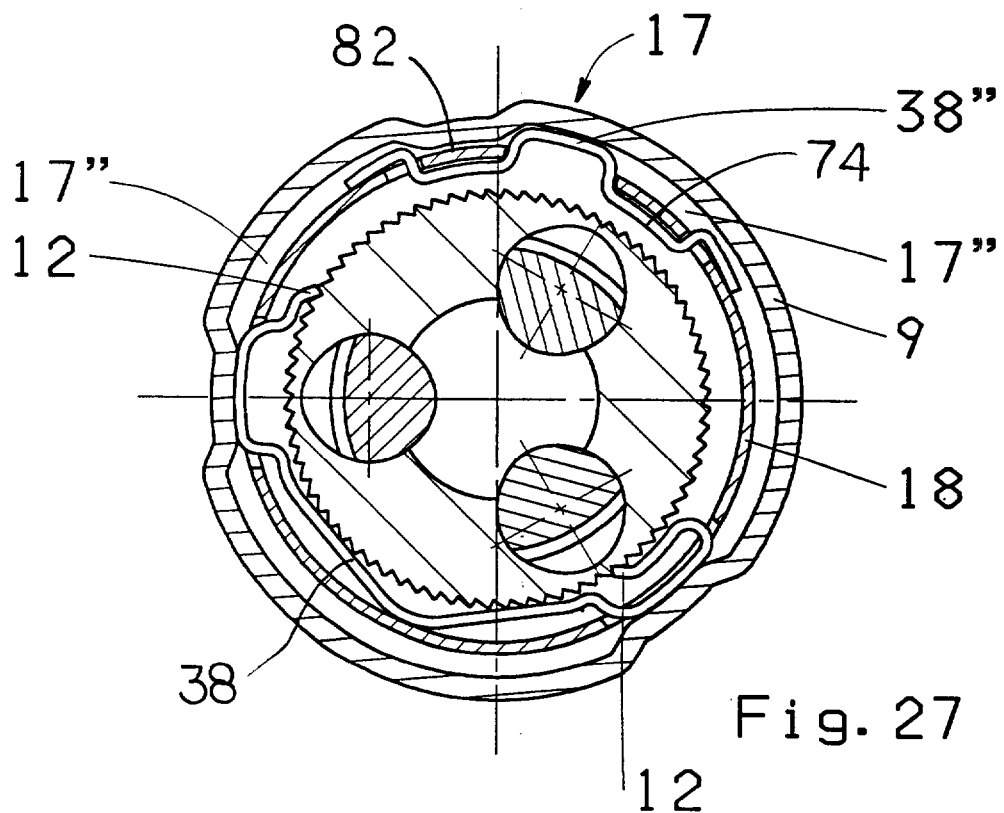
FIG. 27 is an alternative to the system of FIG. 26.

In FIG. 27 the member 38 is formed as in FIG. 9, but somewhat shorter, and a third member 74 is hooked at two locations through the sleeve 18 and coacts with one of the bumps 82 to define firm end positions for the sleeve 9.

Figure 28:
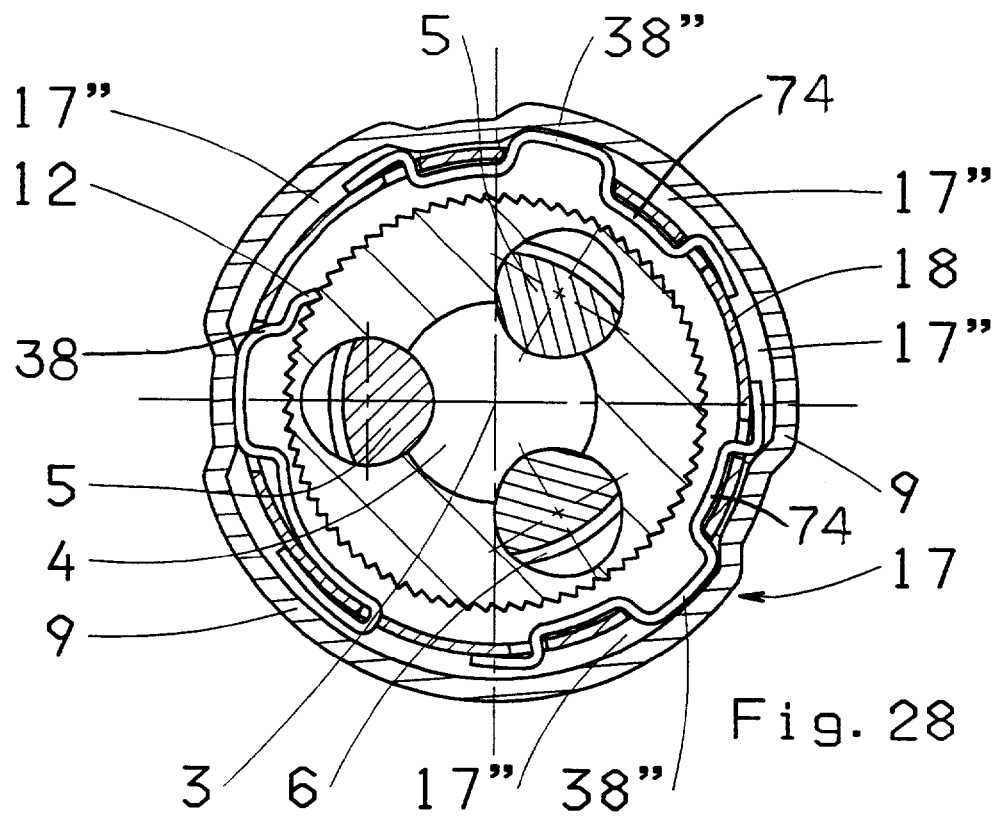
FIG. 28 is an alternative to the system of FIG. 26, here with 3 springs.
Figure 29:
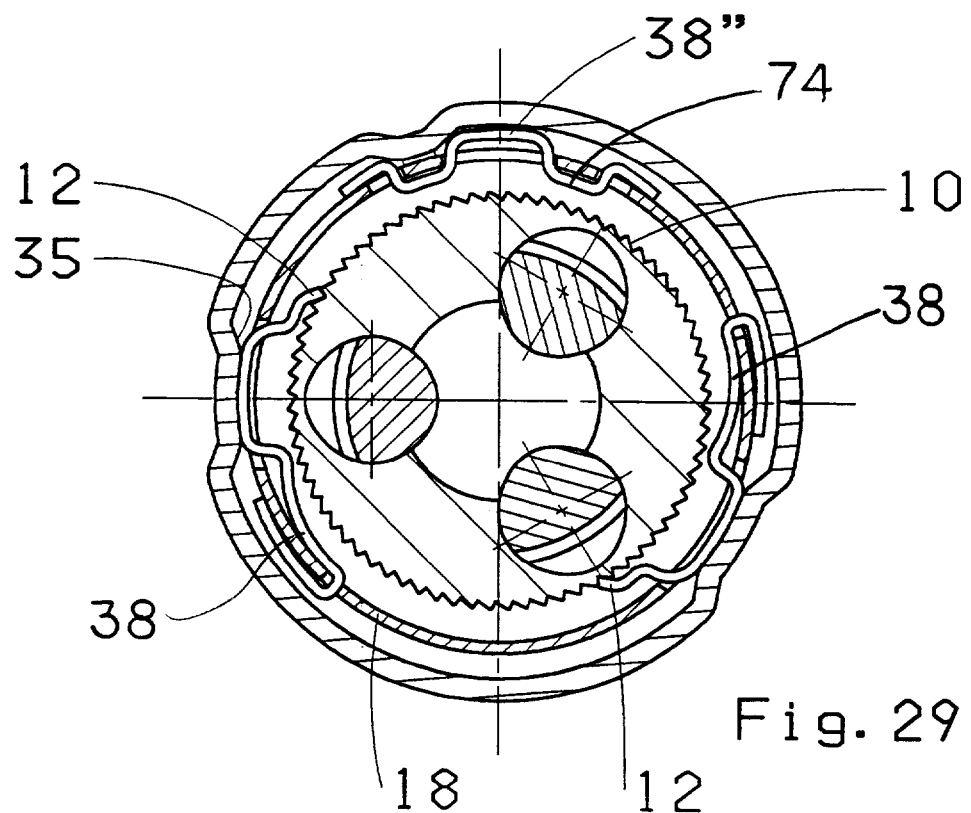
FIG. 29 is an alternative to the system of FIG. 28.
Figure 30:
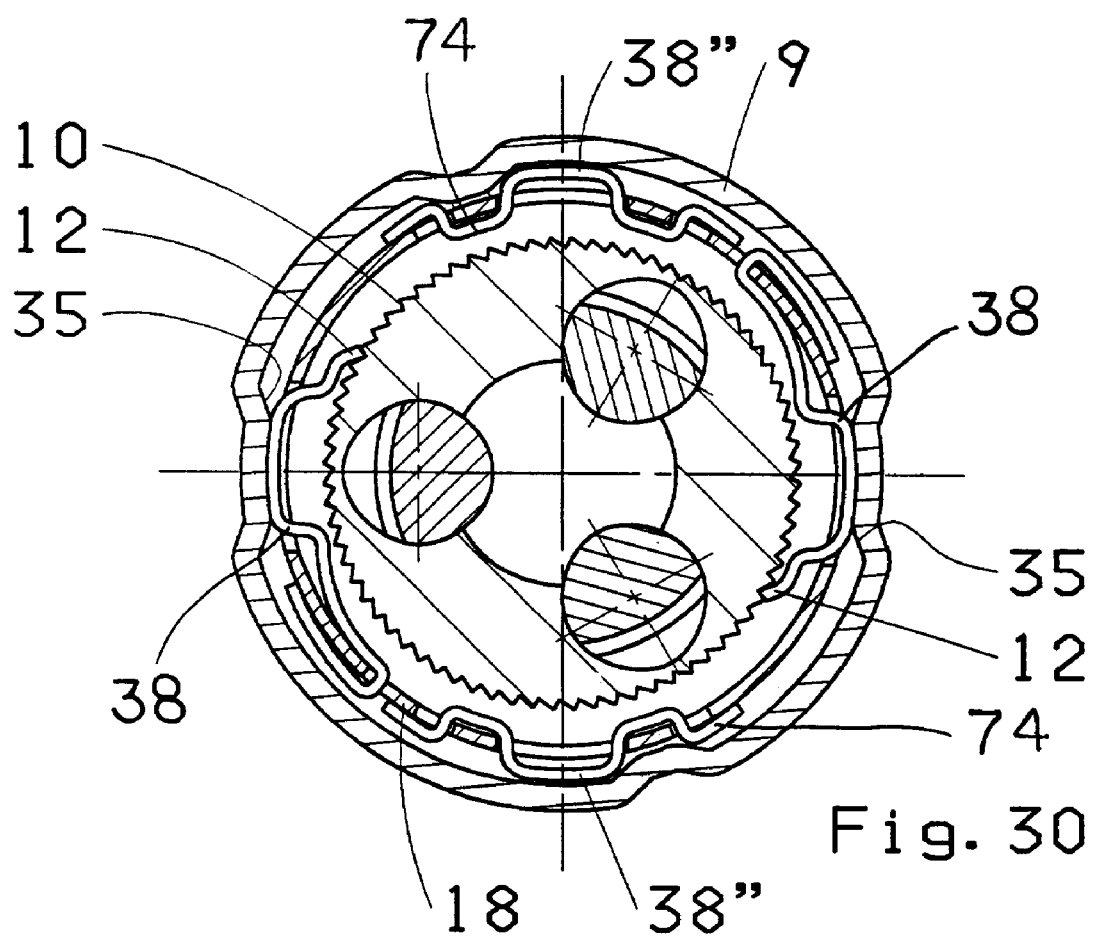
FIG. 30 is an alternative to the system of FIG. 28, with four springs.

The system of FIG. 28 has two short spring members 74 and one short locking member 38 while that of FIG. 29 has two short locking members 38 and one short spring member 74. In FIG. 30 there are two short spring members 74 and two short locking members 38.

Figure 31C:
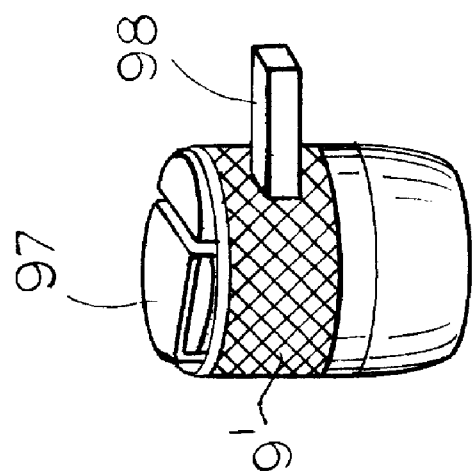
FIGS. 31A through 31F illustrate how the chuck sleeve is made.
Figure 31B:
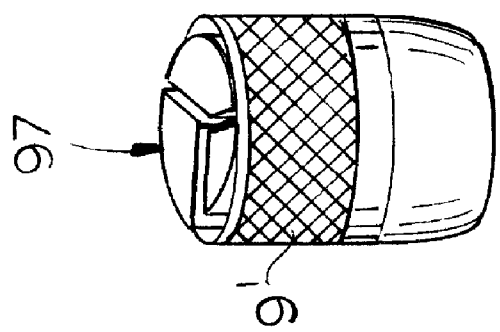
Figure 31A:
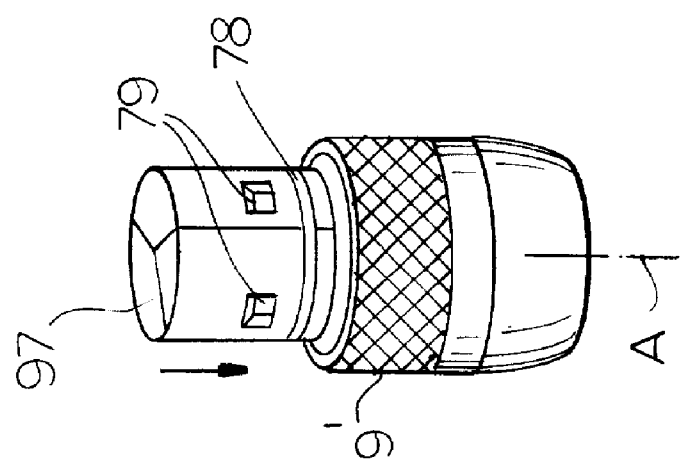

The sleeve 9 can be made as shown in FIG. 31A from a blank 9' that is symmetrical to a central axis A. First a three-part basically cylindrical mandrel 97 formed with a plurality of pockets 79 and an annular groove 78 is fitted into the blank 9' and then expanded as shown in FIG. 31B until its outer surface bears radially outward against the inner surface of the blank 9'.

Then as shown in FIG. 31C a die 98 is pressed radially against the outer surface of the blank 9' in alignment with each of the pockets 79, with either three dies 98 being used or the die 98 and/or workpiece 9' being turned between succeeding pressing operations by the same die 98. This forms the pockets 83 in the sleeve blank 9'. The shape of the workpiece 9' could also be stabilized with a one-piece mandrel that is fitted into the workpiece 9' to a position immediately rear of where the pocket 83 is to be formed, and then using the die 98.

Figure 31D:
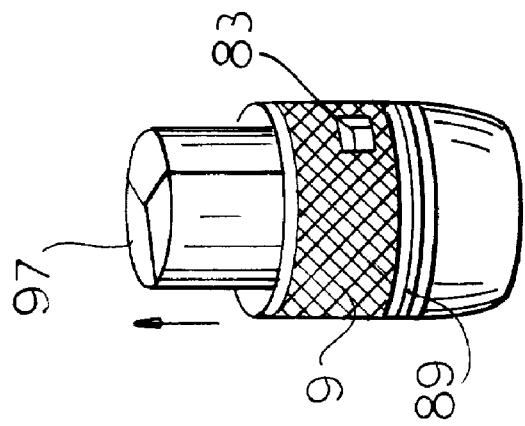

Then as shown in FIG. 31D a roller 99 is pressed against the outer surface of the blank 9' in line with the groove 78 and the workpiece 9' and mandrel 97 are rotated to form the groove 89 in the workpiece 9', turning it into a chuck sleeve 9. The holes 91 can be punched before or after forming the groove 89.

Figure 31E:
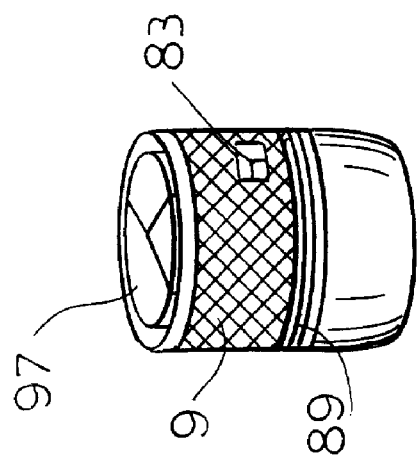
Figure 31F:
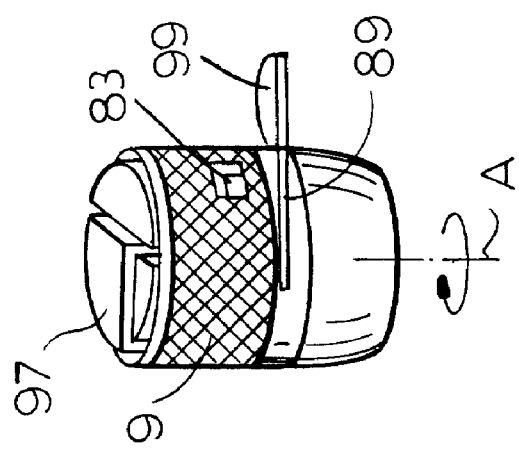

Subsequently as shown in FIG. 31E the mandrel 98 is contracted and then as shown in FIG. 31F pulled axially out of the rear end of the finished sleeve 9.

I claim:

1. A lockable drill chuck comprising:
   a body centered on and rotatable about an axis and formed with a plurality of angled guides opening axially forward at a front chuck end;
   respective jaws axially and radially displaceable in the guides and each formed with a row of teeth;
   a tightening ring axially fixed but rotatable about the axis on the body and having a screwthread meshing with the teeth, whereby rotation of the tightening ring on the body in a tightening direction displaces the jaws in their guides toward one other and rotation in an opposite loosening direction displaces the jaws away from one other;
   a one-piece outer sleeve rotatable about the axis relative to the tightening ring and to the body and formed unitarily with a pressed-in radially inwardly projecting cam formation displaceable angularly relative to the tightening ring between two end positions; and
   means including a locking member engageable with the cam formation and radially displaceable thereby only in one of the end positions thereof into a locked position braced between the chuck body and the tightening ring for blocking rotation about the axis of the tightening ring on the body in the loosening direction and from an unlocked position for permitting such rotation.

2. The lockable drill chuck defined in claim 1 wherein the outer sleeve is metallic, of substantially uniform wall thickness, and formed with an outwardly open pocket at the cam formation.

3. The lockable drill chuck defined in claim 2 wherein the outer sleeve is formed with a plurality of such formations and respective pockets spaced angularly about the axis.

4. The lockable drill chuck defined in claim 1, further comprising
   a shield cap fixed to the chuck body at the front end thereof and covering a front end of the outer sleeve.

5. The lockable drill chuck defined in claim 1 wherein the means includes an array of radially outwardly directed teeth formed on the chuck body, the locking member including
   a tooth part engageable with the teeth,
   a spring part urging the tooth part out of engagement with the teeth, and
   a cam part engageable with the cam formation and displaceable radially thereby jointly with the tooth part only in the one end position.

6. The lockable drill chuck defined in claim 5 wherein the teeth are sawteeth having steep flanks directed in the loosening direction.

7. The lockable drill chuck defined in claim 5, further comprising an inner sleeve fixed rotationally to the locking ring coaxially within the outer sleeve and having an end juxtaposed with an end of the outer sleeve; and means including formations on the sleeve ends for forming a lost-motion rotational coupling between the sleeves and defining the end positions, whereby in the one end position the cam formation engages the cam part and presses the tooth against the teeth and in the other end position the cam formation is out of engagement with the cam part.

8. The lockable drill chuck defined in claim 7, further comprising spring means for releasably retaining the outer sleeve in its end positions.

9. The lockable drill chuck defined in claim 7 wherein the formations on the sleeve ends includes at least one axially directed finger or predetermined angular dimension formed on one of the sleeves and a cutout formed in the other of the sleeves, receiving the finger, and of a substantially greater angular dimension than the finger.

10. The lockable drill chuck defined in claim 9 wherein the outer sleeve is formed at the front end with a plurality of such fingers angularly spaced about the axis, the inner sleeve being formed with a plurality of such cutouts receiving the fingers.

11. The lockable drill chuck defined in claim 9 wherein the outer sleeve is unitarily formed with the fingers and same extend axially back from a front end of the outer sleeve.

12. The lockable drill chuck defined in claim 11 wherein the fingers extend at an acute angle to the axis.

13. The lockable drill chuck defined in claim 5 wherein the locking member has two such tooth parts and two such respective cam parts, the outer sleeve having two such cam formations engageable with the locking-member cam parts.

14. The lockable drill chuck defined in claim 13 wherein the locking member has opposite ends forming the tooth parts and is formed therebetween with the spring part and cam parts.

15. The lockable drill chuck defined in claim 5 wherein the chuck has two such locking members angularly offset from each other and the sleeve has two such cam formations engageable with the respective cam parts.

16. The lockable drill chuck defined in claim 5 wherein the locking member is formed of a single elastically deformable metallic strip.

17. The lockable drill chuck defined in claim 16 wherein the strip is formed with undulations, whereby a damping effect is obtained.

18. The lockable drill chuck defined in claim 5, further comprising a snap ring set in the front end of the chuck and bearing axially backward on the sleeve.

19. The lockable drill chuck defined in claim 1 wherein the outer sleeve is formed with a plurality of angularly spaced slots, the chuck further comprising an annular spring clip engaged around the outer sleeve and having parts projecting through the slots and bearing axially forward on the chuck body.

20. The lockable drill chuck defined in claim 1, further comprising a washer engaged between a rear end of the chuck body and a rear end of the outer sleeve.

21. The lockable drill chuck defined in claim 20 wherein the washer is fixed to the chuck body and is axially coupled to the outer sleeve.

22. The lockable drill chuck defined in claim 21 wherein the outer sleeve has at its rear end an inwardly open groove receiving an outer edge of the washer.

23. The lockable drill chuck defined in claim 22 wherein the washer has a plurality of radially elastically deflectable arms having radially outer ends forming the washer outer edge and received in the groove of the sleeve.

24. A lockable drill chuck comprising:

a body centered on and rotatable about an axis and formed with a plurality of angled guides opening axially forward at a front chuck end;

respective jaws axially and radially displaceable in the guides and each formed with a row of teeth;

a tightening ring axially fixed but rotatable about the axis on the body and having a screwthread meshing with the teeth, whereby rotation of the inner ring on the body in a tightening direction displaces the jaws in their guides toward one other and rotation in a loosening direction displaces the jaws away from one other;

a one-piece outer sleeve rotatable about the axis on the body and formed unitarily with two pressed-in radially inwardly projecting cam formations; and means including an array of radially outwardly directed teeth formed on the body and a locking member displaceable by the cam formations between a locked position braced between the chuck body and the tightening ring for blocking rotation about the axis of the tightening ring on the body in the loosening direction and an unlocked position for permitting such rotation, the locking member including two tooth parts engageable with the teeth, a spring part urging the tooth parts out of engagement with the teeth, and respective cam parts engageable with the cam formations and displaceable radially thereby jointly with the tooth parts.

25. A lockable drill chuck comprising:

a body centered on and rotatable about an axis and formed with a plurality of angled guides opening axially forward at a front chuck end;

respective jaws axially and radially displaceable in the guides and each formed with a row of teeth;

a tightening ring axially fixed but rotatable about the axis on the body and having a screwthread meshing with the teeth, whereby rotation of the inner ring on the body in a tightening direction displaces the jaws in their guides toward one other and rotation in a loosening direction displaces the jaws away from one other;

a one-piece outer sleeve rotatable about the axis on the body and formed unitarily with two pressed-in radially inwardly projecting cam formations; and means including an array of radially outwardly directed teeth formed on the body and two locking members angularly offset from each other and displaceable by the respective cam formations between a locked position braced between the chuck body and the tightening ring for blocking rotation about the axis of the tightening ring on the body in the loosening direction and an unlocked position for permitting such rotation, the locking members each including a tooth part engageable with the teeth, a spring part urging the tooth part out of engagement with the teeth, and a cam part engageable with the cam formation and displaceable radially thereby jointly with the tooth part.

26. A lockable drill chuck comprising:

a body centered on and rotatable about an axis and formed with a plurality of angled guides opening axially forward at a front chuck end;

respective jaws axially and radially displaceable in the guides and each formed with a row of teeth;

a tightening ring axially fixed but rotatable about the axis on the body and having a screwthread meshing with the teeth, whereby rotation of the inner ring on the body in a tightening direction displaces the jaws in their guides toward one other and rotation in a loosening direction displaces the jaws away from one other;

a one-piece outer sleeve rotatable about the axis on the body and formed unitarily with a pressed-in radially inwardly projecting cam formation; and means including an array of radially outwardly directed teeth formed on the body and a locking member formed by a single elastically deformable metallic strip and displaceable by the cam formation between a locked position braced between the chuck body and the tightening ring for blocking rotation about the axis of the tightening ring on the body in the loosening direction and an unlocked position for permitting such rotation, the strip being formed with undulations, whereby a damping effect is obtained the locking member including a tooth part engageable with the teeth, a spring part urging the tooth part out of engagement with the teeth, and a cam part engageable with the cam formation and displaceable radially thereby jointly with the tooth part.

27. A lockable drill chuck comprising:

a body centered on and rotatable about an axis and formed with a plurality of angled guides opening axially forward at a front chuck end;

respective jaws axially and radially displaceable in the guides and each formed with a row of teeth;

a tightening ring axially fixed but rotatable about the axis on the body and having a screwthread meshing with the teeth, whereby rotation of the inner ring on the body in a tightening direction displaces the jaws in their guides toward one other and rotation in a loosening direction displaces the jaws away from one other;

a one-piece outer sleeve rotatable about the axis on the body and formed unitarily with a pressed-in radially inwardly projecting cam formation and with a plurality of angularly spaced slots;

an annular spring clip engaged around the outer sleeve and having parts projecting through the slots and bearing axially forward on the chuck body; and means including a locking member displaceable by the cam formation between a locked position braced between the chuck body and the tightening ring for blocking rotation about the axis of the tightening ring on the body in the loosening direction and an unlocked position for permitting such rotation.

28. A lockable drill chuck comprising:

a body centered on and rotatable about an axis and formed with a plurality of angled guides opening axially forward at a front chuck end;

respective jaws axially and radially displaceable in the guides and each formed with a row of teeth;

a tightening ring axially fixed but rotatable about the axis on the body and having a screwthread meshing with the teeth, whereby rotation of the inner ring on the body in a tightening direction displaces the jaws in their guides toward one other and rotation in a loosening direction displaces the jaws away from one other;

a one-piece outer sleeve rotatable about the axis on the body and formed unitarily with a pressed-in radially inwardly projecting cam formation and at its rear end with a radially inwardly open groove;

a washer fixed to the chuck body and having a plurality of radially elastically deflectable arms having radially outer ends received in the groove of the sleeve; and means including a locking member displaceable by the cam formation between a locked position braced between the chuck body and the tightening ring for blocking rotation about the axis of the tightening ring on the body in the loosening direction and an unlocked position for permitting such rotation.

* * * * *